(12) United States Patent
Baror et al.

(10) Patent No.: US 12,481,961 B2
(45) Date of Patent: Nov. 25, 2025

(54) SYSTEMS AND METHODS FOR USING FEDERATED LEARNING IN HEALTHCARE MODEL DEVELOPMENT

(71) Applicant: Rhino Federated Computing, Inc., Boston, MA (US)

(72) Inventors: Yuval Baror, Ramat Hasharon (IL); Ittai Dayan, Swampscott, MA (US); Yaron Blinder, Haifa (IL)

(73) Assignee: Rhino Federated Computing, Inc., Boston, MA (US)

(*) Notice: Subject to any disclaimer, the term of this patent is extended or adjusted under 35 U.S.C. 154(b) by 126 days.

(21) Appl. No.: 18/180,710

(22) Filed: Mar. 8, 2023

(65) Prior Publication Data

US 2023/0290456 A1   Sep. 14, 2023

Related U.S. Application Data

(60) Provisional application No. 63/269,053, filed on Mar. 9, 2022.

(51) Int. Cl.
| | | |
|---|---|---|
| G06F 17/00 | (2019.01) | |
| G06F 21/62 | (2013.01) | |
| G06Q 10/101 | (2023.01) | |
| G16H 10/60 | (2018.01) | |

(52) U.S. Cl.
CPC ....... G06Q 10/101 (2013.01); G06F 21/6254 (2013.01); G16H 10/60 (2018.01)

(58) Field of Classification Search
CPC .............. G06Q 10/101; G06F 21/6254; G06F 21/6245; G16H 10/60; G16H 30/20; G16H 50/70; G16H 50/20; G16H 40/63
See application file for complete search history.

(56) References Cited

U.S. PATENT DOCUMENTS

| | | | |
|---|---|---|---|
| 9,819,650 B2* | 11/2017 | Soon-Shiong | G16Z 99/00 |
| 11,403,718 B1* | 8/2022 | Knox | G06Q 50/01 |
| 11,487,969 B2* | 11/2022 | Huth | G06F 18/28 |
| 11,741,262 B2* | 8/2023 | Blackport | G06F 16/21 726/26 |
| 11,935,643 B2* | 3/2024 | Frosch | G16H 10/60 |
| 2020/0402625 A1* | 12/2020 | Aravamudan | G06F 21/6245 |
| 2021/0209249 A1* | 7/2021 | Hoffer | G16H 50/20 |
| 2021/0377231 A1 | 12/2021 | Soon-Shiong et al. | |
| 2022/0129584 A1 | 4/2022 | Blackport et al. | |
| 2023/0289728 A1* | 9/2023 | Baror | G16H 10/60 |

OTHER PUBLICATIONS

Jean Louis Raisaro et al., Protecting Privacy and Security of Genomic Data in i2b2 with Homomorphic Encryption and Differential Privacy. IEEE/ACM Trans. Comput. Biol. Bioinformatics 15, 5, 1413-1426. <https://doi.org/10.1109/TCBB.2018.2854782>, (Sep. 2018).*

PCT International Application No. PCT/US23/63974, International Search Report and Written Opinion of the International Searching Authority, dated Jul. 26, 2023, 14 pages.

(Continued)

*Primary Examiner* — Greta L Robinson
(74) *Attorney, Agent, or Firm* — DLA Piper LLP (US)

(57) ABSTRACT

Systems and methods are provided that utilize a federated learning system for model development.

15 Claims, 13 Drawing Sheets

(56) References Cited

OTHER PUBLICATIONS

Nvidia, "Nvidia Research: First Privacy-Preserving Federated Learning System for Medical Imaging," YouTube, https://www.youtube.com/watch?v=Jy7ozgwovgg, Oct. 13, 2019.

Alarcon, "NVIDIA and King's College London Debut First Privacy-Preserving Federated Learning System for Medical Imaging," NVIDIA Developer Technical Blog, https://developer.nvidia.com/blog/first-privacy-preserving-federated-learning-system/?ncid=so-yout-39336&linkId=100000008539607#cid=organicSocial_en-us_YouTube_NVIDIA-Research-Research-NR01, Oct. 13, 2019, 4 pages.

Roth, et al., "Creating Robust and Generalizable Al Models with Nvidia Flare," Nvidia Developer Technical Blog, https://developer.nvidia.com/blog/creating-robust-and-generalizable-ai-models-with-nvidia-flare/, Nov. 29, 2021, 5 pages.

\* cited by examiner

SYSTEMS AND METHODS FOR USING FEDERATED LEARNING IN HEALTHCARE MODEL DEVELOPMENT

CROSS-REFERENCE TO RELATED APPLICATIONS

This application claims priority to U.S. Provisional Application No. 63/269,053, filed Mar. 9, 2022, which is herein incorporated by reference in its entirety.

BACKGROUND OF THE DISCLOSURE

The artificial intelligence (AI) market for healthcare may grow from $5 billion to $25 billion by 2025. Such an adoption of AI in clinical environments should have significant impacts, yet developers still face many obstacles in building and maintaining performant solutions.

Today, healthcare models are typically trained on data from a single hospital. In addition, 90% of models are trained on data from Massachusetts, New York, and California, limiting models' exposure during training and causing weaknesses in generalizing to other portions of the population.

The FDA, therefore, is beginning to require a higher bar for approvals, including validation studies across multiple sites and analyses that would prove that the model is relevant to diverse populations. Acquiring these data sets can take months and can have exorbitant costs for companies.

SUMMARY OF THE DISCLOSURE

According to one aspect of the present disclosure, a federated learning system for model development can include a server accessible by each of a first and second client agent. The server can include instructions which, when executed by one or more processors, cause the server to perform a process. The process can be operable to create a project based on an indication received from a first user device; receive collaborator information from the first user device, the collaborator information identifying one or more collaborators at a second site; receive a model configuration from the first user device; receive a request to import a first cohort from the first client agent residing on a first network associated with the first site, wherein the first cohort was generated by the first client agent accessing a first dataset, pseudonymizing or deidentifying it if it contains protected health information (PHI) or personal identifiable information (PII); receive a request to import a second cohort from the second client agent residing on a second network associated with the second site, wherein the second cohort was generated by the second client agent accessing a second dataset, pseudonymizing or deidentifying it if it contains PHI or PII; and initiate, via one or more containers, a federated learning process based on the model configuration using the first and second cohorts as training data, the server operating as a federated server and the first and second client agents operating as federated learning clients.

In some embodiments, the process is further operable to generate a link to a communication platform for the project. In some embodiments, the process is further operable to provide summary information for the first and second cohorts for display on a user interface of the first user device or through an application programming interface (API) used by the first user on the first user device. In some embodiments, the summary information comprises at least one of statistics about the cohort or statistics about different fields within the cohort. In some embodiments, initiating the federated learning can include exporting the first and second cohorts to one or more local directories or configuring the first and second cohorts to be accessible via an adapter; and accessing the first and second cohorts by the one or more containers via the one or more local directories or the adapter.

In some embodiments, receiving the model configuration can include receiving a machine learning model packaged as a container, as code to be run directly, or into a container by the federated learning system. In some embodiments, the process is further operable to provide training performance data from the federated learning process for display on a user interface of the first user device or accessible through an API used by the first user on the first user device, the training performance data comprising at least one of one or more model performance metrics or one or more loss-cases. In some embodiments, the process is further operable to receive an updated first cohort from the first client agent; receive an updated second cohort from the second client agent; and initiate, via one or more containers, an updated federated learning process based on the model configuration using the first and second cohorts, the server operating as the federated server and the first and second client agents operating as the federated learning clients.

In some embodiments, the process is further operable to receive an updated model configuration from the first user device; and initiate, via one or more containers, an updated federated learning process based on the updated model configuration using the first and second cohorts, the server operating as the federated server and the first and second client agents operating as the federated learning clients. In some embodiments, the process is further operable to receive a schema definition from the first user device; and provide the schema definition to at least one of the first client agent to validate the first dataset or the second client agent to validate the second dataset.

In some embodiments, the process is further operable to receive a project permission configuration from the first user device, the configuration comprising one or more data permissions for the one or more collaborators; and enforce the permission configuration. In some embodiments, the process is further operable to receive an updated schema definition from the first user device; receive an updated first cohort from the first client agent; transmit an indication to the one or more collaborators that the updated schema definition has been received; receive an updated second cohort from the second client agent; and initiate, via one or more containers, an updated federated learning process based on the model configuration using the first and second cohorts, the server operating as the federated server and the first and second client agents operating as the federated learning clients.

In some embodiments, the server is further operable to cause model results to be displayed on the first user device, wherein the displayed model results comprise at least one of a pre-configured set or a user-defined set of results. In some embodiments, the server is further operable to receive a plurality of training experiments from the first user device, each training experiment comprising at least one of a distinct cohort, a distinct model hyper-parameter, or a distinct model architecture; and receive an indication for each training experiment from the first user device, each indication triggering a training of the model configuration with the respective training experiment. In some embodiments, the process is further operable to at least one of compare performances of the plurality of training experiments; track versions of a schema definition, the model configuration, and the first and second cohorts; or perform one or more additional model runs for each version of a cohort.

According to another aspect of the present disclosure, a federated learning system for model development can include a server accessible by a client agent. The server can include instructions which, when executed by one or more processors, cause the server to perform a process. The process can be operable to receive, from a first user device, a selection of a cohort, wherein the cohort was generated by a client agent accessing a dataset and pseudonymizing or deidentifying the dataset if the dataset comprises at least one of PHI or PII; receive, from the first user device, a selection of one or more cases from the selected cohort; generate a secure access list that comprises the one or more selected cases from the cohort; receive, from the first user device, permission information allowing a user to view the secure access list; generate a link to the secure access list; receive a request to access the link from a second user device; verify permission of the link selection based on the permission information; establish a set of one or more encrypted channels between the second user device and the first client agent; access the selected first cohort from a database via the one or more encrypted channels; and launch a viewer on the first user device to display the selected one or more cases.

In some embodiments, the viewer can include comprises an in-tool ability to create annotations and an object segmentation functionality. In some embodiments, the viewer is configured to display at least one of tabular data, imaging data, or file data. In some embodiments, tabular data, imaging data, and file data are not persisted outside an associated site firewall.

According to another aspect of the present disclosure, a system for encrypted federated learning can include a client agent residing on a network associated with a respective site and being configured to access an associated dataset; and a server accessible by the client agent. The server can include instructions which, when executed by one or more processors, cause the server to perform a process. The process can be operable to receive encrypted code from a user device; receive a code key from the user device; transmit the encrypted code and the code key to the client agent; initiate a federated learning process, the server operating as a federated server and the client agent operating as a federated learning client; receive a plurality of model weights from the client agent; and encrypt the plurality of model weights. The client agent can be configured to decrypt the encrypted code with the model key; and execute the decrypted code to generate the plurality of model weights.

DESCRIPTION

Figure 1:
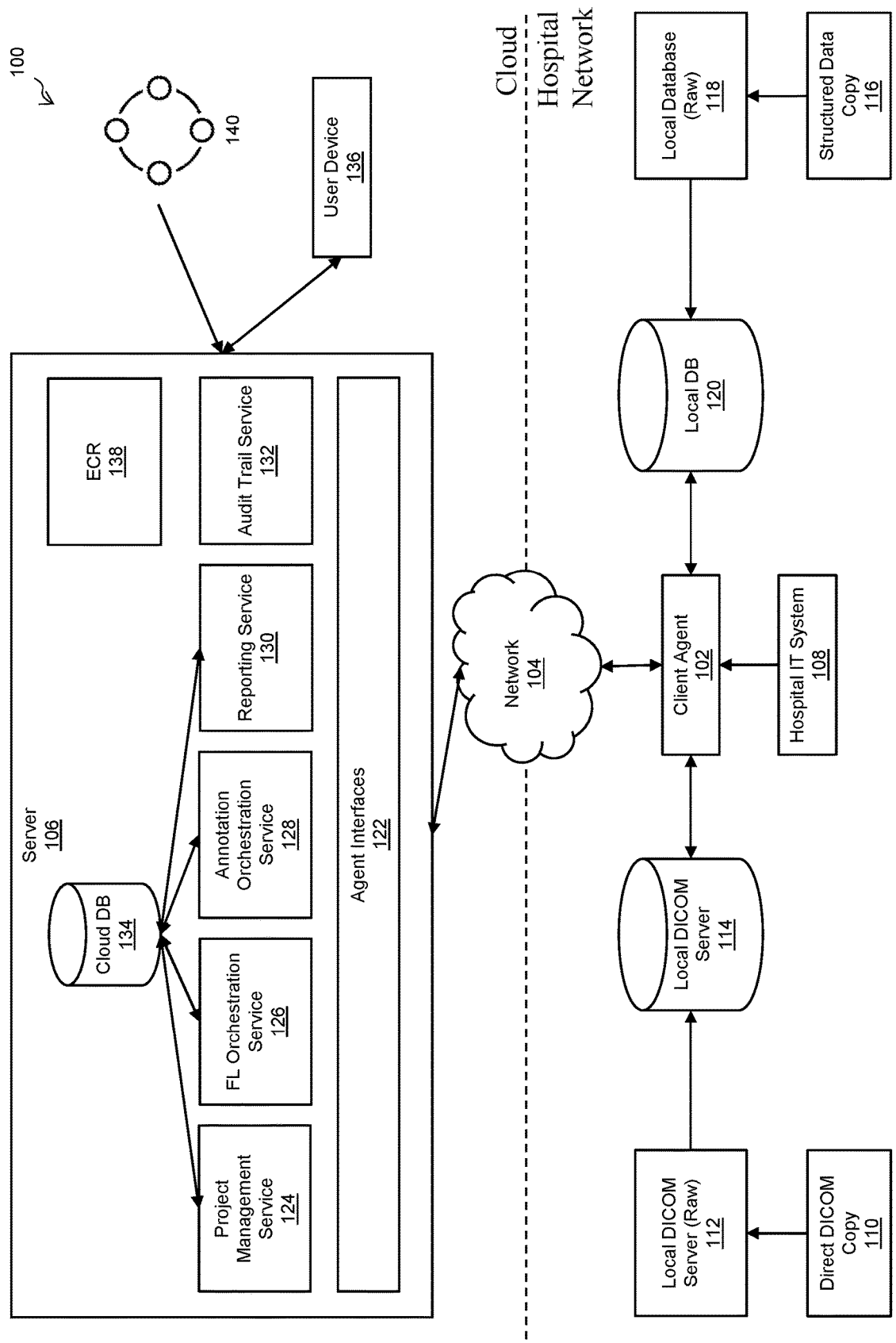
FIG. 1 is a block diagram of an example system for using federated learning in healthcare model development, according to some embodiments of the present disclosure.

The following detailed description is merely exemplary in nature and is not intended to limit the invention or the applications of its use.

Embodiments of the present disclosure thus address the challenges described herein and can accelerate the growth of AI-based healthcare solutions utilizing a distributed learning system powered by the privacy preserving technology of federated learning (FL). FL is the distributed training of machine learning models across various devices without exchanging the actual datasets between the devices (only aggregate data like model parameters). The disclosed solution is a regulatory-compliant, full-cycle, AI product development platform that can enable continued model refinement, revalidation, and redeployment over time and geographies. Rather than sharing actual datasets, model weights, gradients, and the like are shared. This can drastically reduce the life-cycle maintenance costs for these models and ensure long-lasting, optimal performance. The solutions described herein can provide a full life-cycle support platform for manufacturers of AI healthcare products. Developers and manufacturers can use the disclosed systems and methods to take an initial prototype to a fully commercialized and maintained model much more quickly and easily than before. In addition, hospitals and research institutions will be able to train and validate their algorithms with multiple collaborators, adding value to their intellectual property and translating research into product in collaboration with industry. The disclosed FL approach can alleviate the risk of data/value leaks, maintain control over data, and allow providers to leverage significant investments in IT infrastructure to date. The embodiments described herein can operate on top of many existing IT assets, rather than aggregating data into new costly systems.

This can offer transformative advantages to the market as it can break down data silos, providing easy access to diverse and rich data from a multitude of hospitals and institutions. This can lead to a steep change in model robustness while preserving data privacy, as hospital data doesn't leave the hospital network.

As an example, a medical researcher may have developed a machine learning model for detecting the severity of a stroke based on analysis of a brain CT scan. The researcher may then want to improve the model using external data, as the model was only trained on data at the researcher's own hospital or institution. However, accessing data from other academic and/or medical institutions typically requires significant technical and legal work. The disclosed embodiments provide a system and platform in which the researcher can collaborate with researchers at other institutions (i.e., collaborators) to train machine learning models on multiple datasets from these institutions without sharing the datasets themselves, thus alleviating the significant legal and technical hassle that this would traditionally require. The original researcher can install software configured to perform the methods described herein and then login to the platform to create a new project (i.e., a collaboration between different entities with the goal of performing federated learning or validation of a model). The platform allows the researcher to define a schema (i.e., the expected data format including field identifiers, field types, an indication whether or not the field may contain protected health information or PHI, etc.), add collaborators (the other researchers), and configure various settings such as privacy settings and permissions. Then, the researcher imports a cohort (i.e., a dataset that includes various cases, each case relating to a person and including various data points about that person) to the project via the platform, such as via importing a CSV file to a local server residing behind the hospital firewall. DICOM (digital imaging and communications in medicine—a communications standard for medical images; a DICOM file represents a single study and can include metadata in the form of DICOM tags and multiple series of images) data is also imported. From here, the disclosed system generates a pseudonymized copy of the data. If the cohort doesn't conform to the schema, the researcher will be notified and can correct any errors in the cohort to successfully import it into the platform. Once this has been completed, the collaborator can view the schema, create their own cohort, and import it to the project (all cohort data will be kept on a server on the collaborator's network—not uploaded to the cloud). The system can validate that the collaborator's cohort matches the project schema. Now that there are multiple accessible cohorts (one from the original researcher's institution and one from the collaborator's institution), the researcher can initiate the federated learning process, training the model on both cohorts.

FIG. 1 is a block diagram of an example system 100 for using federated learning in healthcare model development, according to some embodiments of the present disclosure. The system includes a client agent 102 and a server 106, which are communicably coupled via a network 104. Although there is only one client agent 102 shown in FIG. 1, any number of client agents is possible. In some embodiments, the client agent 102 can be installed on-premises at each of one or more hospital sites or other similar sites, as demarcated by the dotted line. In other embodiments, the client agent 102 can be installed in the cloud, such as in a virtual private cloud being used by the associated institution. The client agent 102 has access to the hospital's patient data (de-identified or raw). The client agent 102 can also access the server 106 in a cloud environment for orchestration, which can include the cloud environment requesting that the agent 102 perform specific actions (e.g., analyze patient data, train a model, etc.). The client agent 102 would then perform the requested action and provide a response to the cloud. In some embodiments, the client agent 102 can include software installed in one or more of the following ways: (1) a cloud-based hospital-provisioned server in a virtual private cloud (VPC); (2) an on-site hospital-provisioned virtual machine (VM); or (3) an on-site server, which can be provided by the entity managing the cloud environment. In some embodiments, the minimum technical specifications of the client agent 102 can be pre-defined by the entity managing the cloud environment. In some embodiments, the client agent 102 can include a set of docker containers with different components to be run and a management/orchestration layer (e.g., Kubernetes) for the containers.

The client agent 102 is further communicably coupled to a local raw DICOM server 112, which contains raw data (i.e., contains protected health information (PHI)) from a direct DICOM copy 110; a local DICOM server 114 with clean/de-identified data (i.e., copies of the raw data after applying deidentification techniques); a local raw database 118, which can be a Postgres database and can store raw structured input data (containing PHI, such as structured data copy 116) that is imported into the system 100; and a local database 120, which can be a Postgres database and can store de-identified structured input data, as well as general metadata (e.g., cohort indexes). Additionally, the client agent 102 can interact with a hospital IT system 108, manage local processes/workflows, and provide interfaces for local interactions by researchers/collaborators, although interfaces may also be provided directly by the cloud. Finally, the client agent 102 can run a client for running local federated learning workloads via a FL SDK e.g. NVIDIA FLARE, Clara Train, PySyft, Flower (or other similar SDK).

Figure 3:
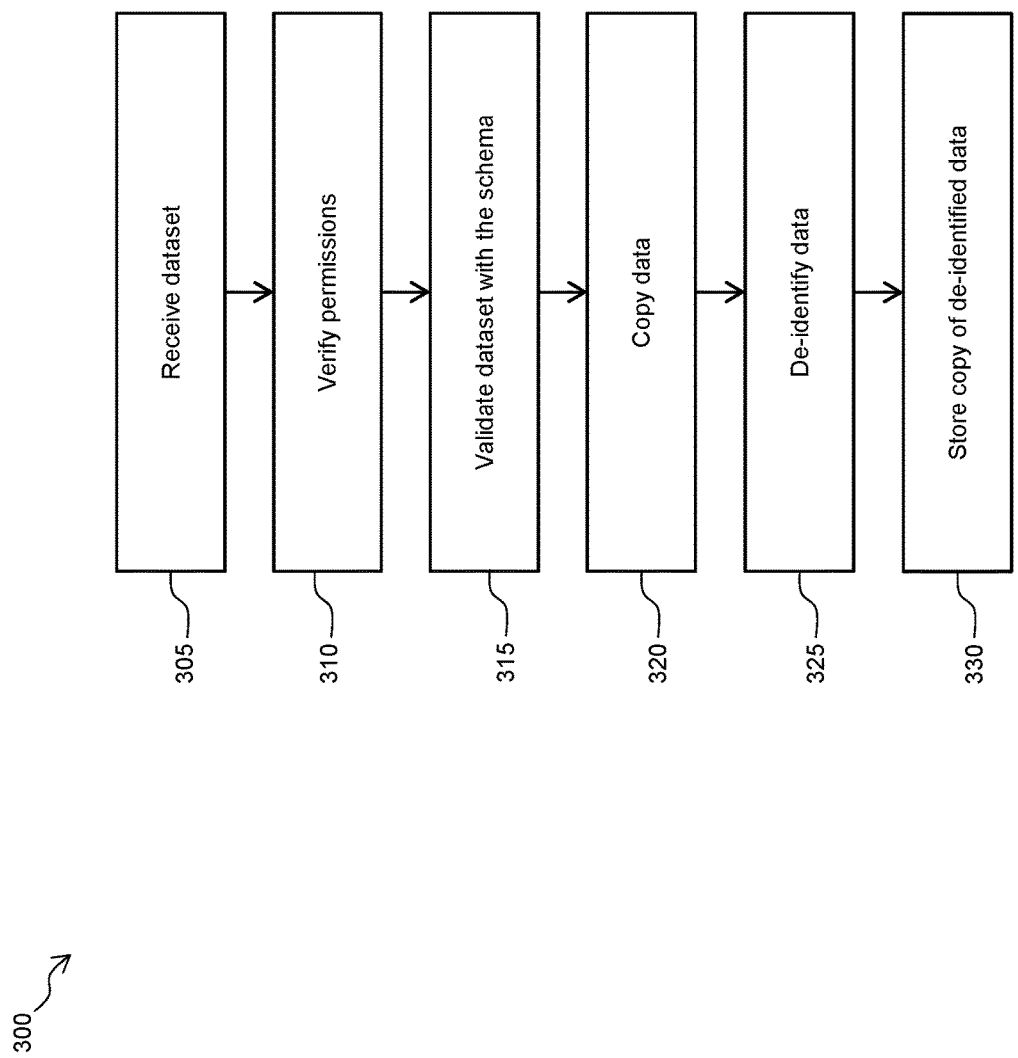
FIG. 3 is an example process for creating a cohort, according to some embodiments of the present disclosure.
Figure 4:
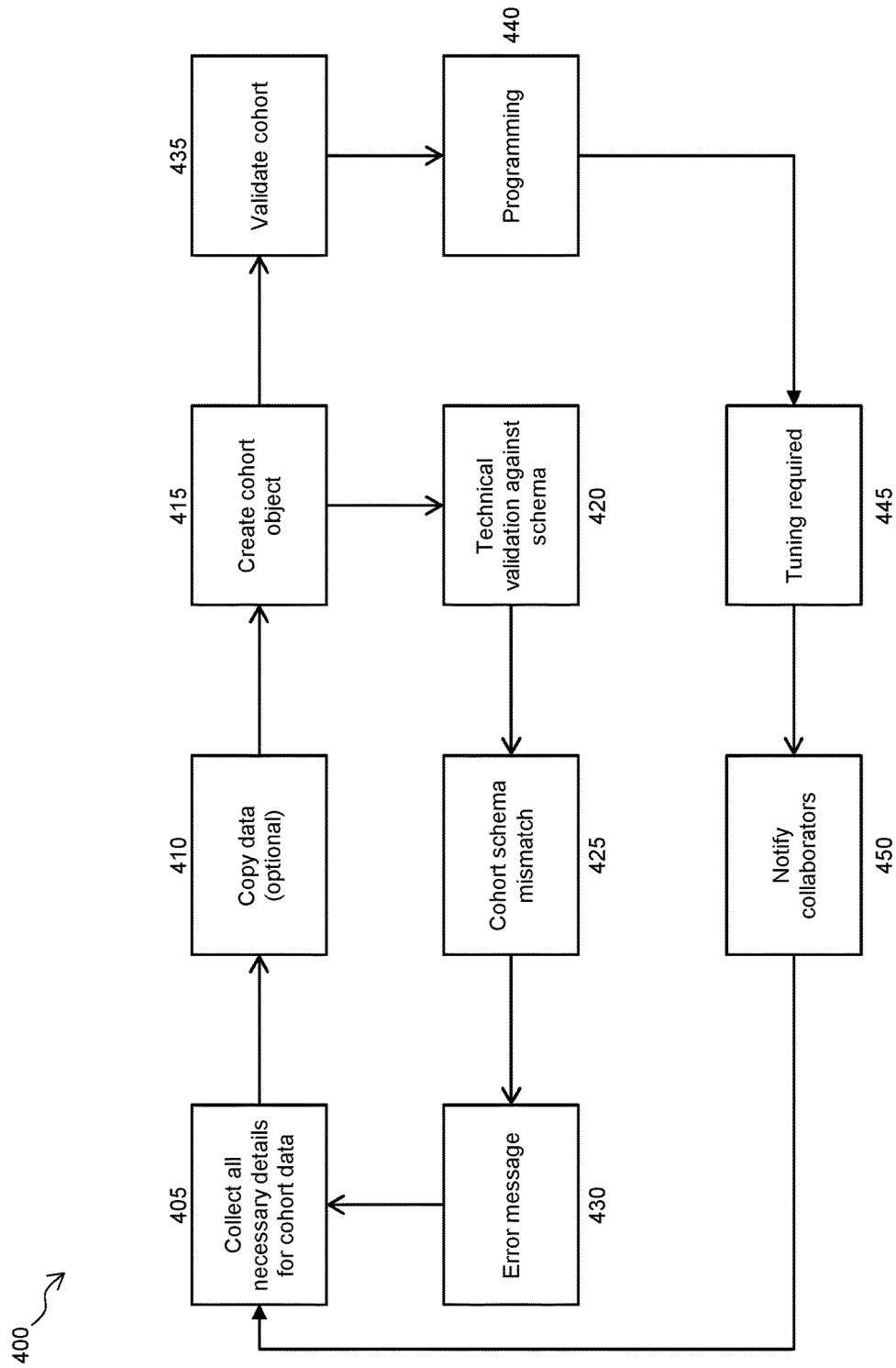
FIGS. 4-6 show example flows for cohort review and tuning, according to some embodiments of the present disclosure.

In some embodiments, the client agent 102 can perform a cohort import process (see FIGS. 3-4). In some embodiments, the client agent 102 can perform a cohort export process on a local cohort (i.e., a cohort that was imported from the same hospital). The export process can dump images, CSV data, and other file data into a directory created in the output location. The images can be exported in DICOM format and the CSV data can be exported as a CSV file and the other files can be exported in their original format (e.g. png, pdf, txt, etc.). In some embodiments, the client agent 102 can obtain information associated with a cohort, such as returning deidentified data and/or aggregate statistics about a cohort. Statistics can include total cases, percentiles for numeric fields, numbers in each category for categorical fields, the distribution of the number of series' in a DICOM study, the distribution of a number of images in a DICOM series, and the number of cases with a certain annotation. In some embodiments, the client agent 102 can enable a remote viewer, which can entail making a de-identified version of a selected DICOM available to a remote viewer. In some embodiments, the client agent 102 can import the results of running federated learning or validation into the database 134. In some embodiments, the client agent 102 can obtain training information, such as start and end times and performance statistics (e.g., precision, recall, identifiers of a number of sample FPs and FNs, etc.).

Additionally, the client agent 102 is configured to perform a de-identification/pseudonymization process to remove PII and PHI from data. In some embodiments, this can include the HIPAA safe harbor deidentification processes as defined under HIPAA. Performing the de-ID process on a dataset results in the creation of a limited dataset. A limited dataset can be defined as protected health information that excludes direct identifiers of the individual, relatives, employers, or household members. In a limited dataset, there are no details that can directly identify a person (e.g., name, birthdate, phone number, etc.), all identifiers from the original data have been replaced with new identifiers, birthdates have been reduced to only birth year (except for persons over 90 the birthyear has been removed), and all other datetimes have been shifted so that actual admission time cannot be identified, but the number of hours between admission and discharge can be calculated.

The server 106 can include multiple services, each handling a specific subset of functionality. In some embodiments, the services can be included in a single monolith and may share a single database. In other embodiments, the services may rely on separate databases depending on their specific requirements and interdependencies. For example, the audit trail service 132 could have its own database to persist data for long periods of time and not be prone to frequent updates and schema migrations.

The server 106 includes a cloud database 134, which can be a Postgres database. The database 134 is configured to store structured data that doesn't include any patient data (e.g., PHI). In some embodiments, the database 134 can include an AWS Aurora instance. The server 106 further includes a project management service 124, which is configured to enable CRUD operations (i.e., create, read, update, and delete operations) on all project-related objects. The project management service 124 is also configured to manage the interactions between these objects. The server further includes an FL orchestration service 126, which is configured to handle orchestration of federated learning using FL SDKs, such as NVIDIA FLARE, Clara Train, PySyft, Flower, etc. although this is not intended to be limiting and other SDKs can be used. In some embodiments, the FL orchestration service 126, can create a FL Server for each training run, connecting via network 104 or agent interfaces 122 to FL Clients for that run within the client agents 102. The server 106 also includes a web-based user interface (not shown) that functions as a gateway through which users interact with the system 100. In some embodiments, the web-based user interface can include an AWS EC2 server running nginx, and user interaction can be performed in Javascript with a web framework like React, Vue, Angular, or other Javascript frameworks. The server 106 also includes a REST API (not shown) that allows users to interact programmatically with the system 100. In some embodiments, a Software Development Kit (SDK) can be provided (e.g. in Python) to make programmatic interaction with server 106 easier. The server 106 also includes agent interfaces 122 for interacting with the client agent 102, although in some embodiments user may interact with a cloud interface directly, rather than an agent interface. The cloud user interface can include a programmatic user interface, such as a REST API as well as a Python library. In some embodiments, the agent interfaces 122 can be gRPC and REST over SSL. The server 106 also includes an annotation orchestration service 128 that is configured to handle orchestration of site agnostic annotation workflows, a reporting service 130 configured to generate reports for different stakeholders (e.g., FDA submission supporting documentation), and an audit trail service 132 configured to maintain an audit trail for projects and service the APIs necessary for querying the audit trail for a specific project. Annotation process include adding a "ground truth" to imaging data, such as by adding a label for the entire image (e.g., "cancer" or "no cancer"). Annotating can also include drawing a shape around a finding or Region of Interest (ROI), called segmentation.

In some embodiments, the server 106 can be hosted on AWS, although this is merely exemplary in nature.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

Figure 10:
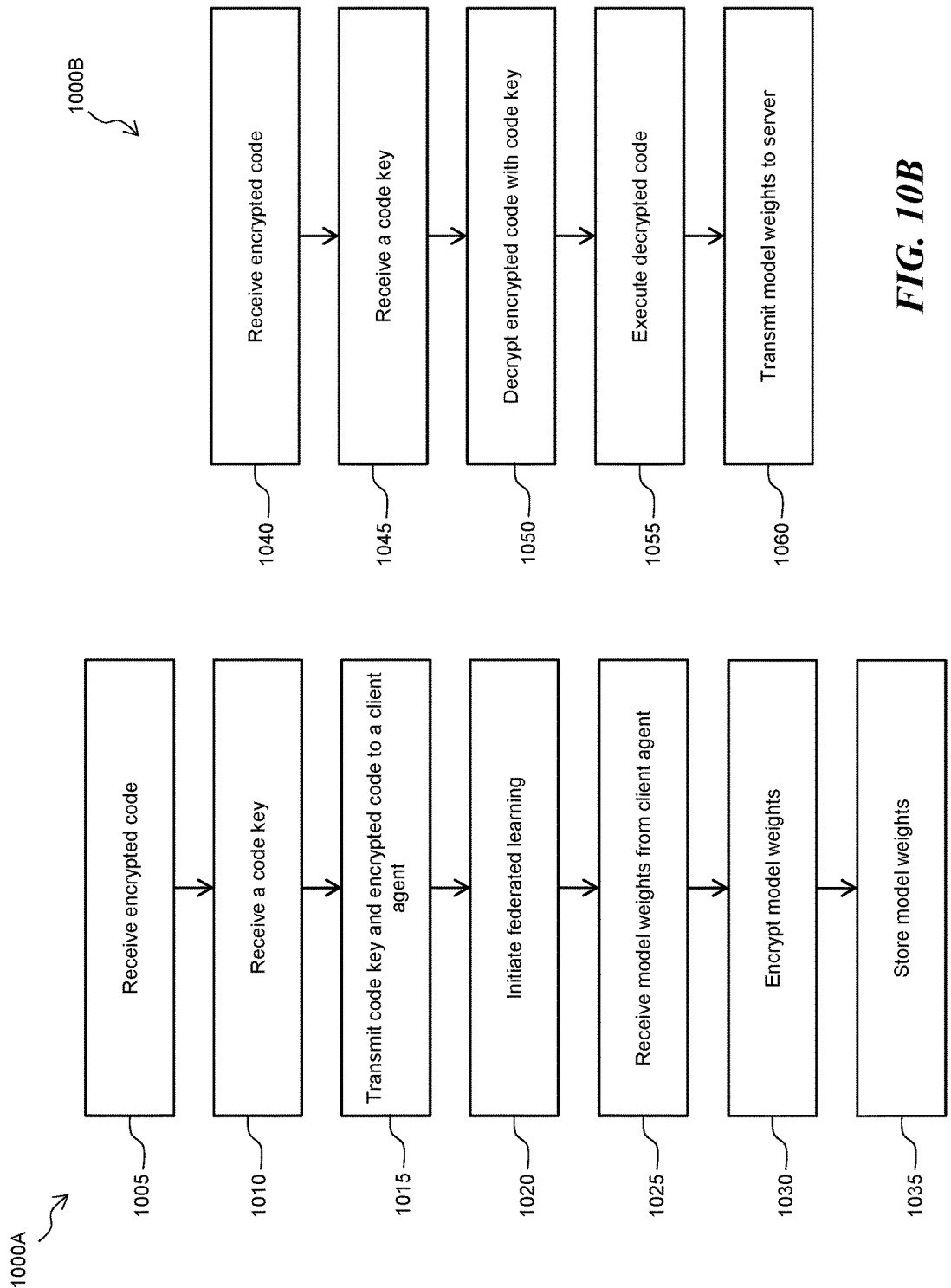
FIGS. 10A-10B show example processes for encrypted federated learning, according to some embodiments of the present disclosure.

Server device 106 may include any combination of one or more of web servers, mainframe computers, general-purpose computers, personal computers, or other types of computing devices. Server device 106 may represent distributed servers that are remotely located and communicate over a communications network, or over a dedicated network such as a local area network (LAN). Server device 106 may also include one or more back-end servers for carrying out one or more aspects of the present disclosure. In some embodiments, server device 106 may be the same as or similar to server device 1000 described below in the context of FIG. 10. In some embodiments, server 106 can include a primary server and multiple nested secondary servers for additional deployments of server 106. This can enable greater scalability and deployability, as well as the ability to deploy asset-based severity scoring systems at a specific premises if requested by a user. In some embodiments, server device 106 may run a container orchestration service (e.g. Kubernetes) to manage the different services being run on it.

The system also includes a user device 136 that allows a user (e.g., project leader or researcher) to interface with the server 106. A user device 136 can include one or more computing devices capable of receiving user input, transmitting and/or receiving data via the network 104, and or communicating with the server 106. In some embodiments, a user device 136 can be representative of a computer system, such as a desktop or laptop computer. Alternatively, a user device 136 can be a device having computer functionality, such as a personal digital assistant (PDA), a mobile telephone, a smartphone, or other suitable device. In some embodiments, a user device 136 can be the same as or similar to the device 1100 described below with respect to FIG. 11. In some embodiments, the system 100 can include any number of user devices 136.

An advantage of the system 100 is data persistency: (1) patient data and imaging data (whether raw or de-identified) does not leave the hospital network, with the exception being the enablement of remote viewing of data across sites, where the underlying data will not move, but a bitstream with data is tunneled via an encrypted channel to a remote viewer; (2) any data that can be stored in the cloud will be stored in the cloud; (3) data imported into the system 100 (raw or de-identified) can be persisted at least for a short amount of time (e.g., a few months); (4) data needed for auditing a project can be persisted for a long period of time (e.g., several years); and (5) data needed for recreating/resuming a project can be persisted for a long period of time (e.g., several years), with the exception of imaging data that may be persisted for a short period of time and reread from hospital IT systems as needed.

Another advantage of the system 100 is data security: (1) communications between the client agent 102, the server 106, and user device 136 can be done over encrypted channels (e.g., https); (2) user can be authenticated before being able to access any information in the system 100, such that their access level to each piece of information will be verified before this information is made accessible to them; (3) patient data and imaging data (whether raw or de-identified) will not leave the associated hospital network, the exception (as described above) being remote viewing of imaging data; (4) raw data and translation tables for pseudonymization can be stored in a location that can only be accessed by a user with access to the associated hospital network (e.g., an employee at the hospital or an authorized officer of the entity managing the system 100 with VPN access to the hospital) and only after verifying the permissions of the user to access the specific data; and (5) access to the cloud environment (e.g., the server 106) can be limited to users who have been authenticated and had their access verified (e.g., via a login system or AWS account validation or another Single Sign On (SSO) account validation system).

Another advantage of the system 100 is code security: (1) code can be hosted on Github as a private repo and access can be limited to authorized team members of the entity managing the system 100; (2) any change to any file (e.g., code, configuration, etc.) in the Github repo can require a review by a person other than the one who made the change; (3) no open-source libraries may be used if the license is unknown or if the license is GPL or similar; (4) all libraries used can be documented including a link to their license for future reference; and (5) any code copied from the Internet (e.g., from StackOverflow) can be prefixed by a comment with a link to the source for verification and usage rights.

In some embodiments, the system 100 includes a container 140 and a container registry service (e.g. Elastic Container Registry (ECR)) 138. The container 140 can be used as a mechanism via which users provide the server 106 with code to be run at different sites, such as the client agent 102. Containers can be quite large (hundreds of MBs to multiple GBs) and uploading them from a user device 136 can be a long and error-prone process. In addition, this can become even more troublesome when there are several subsequent small changes that are made to the container (e.g., when debugging and changing minimal lines of code). Therefore, the server 106 can utilize the container registry service 138 and a docker push command to provide a mechanism with which to upload docker containers to the cloud environment in a way that minimizes the data that is uploaded. This can be achieved by analyzing the different layers within the docker container and only uploading layers that have any difference from the version in the cloud. In some embodiments, container input data can be deleted when the container finishes running. In some embodiments, container output data can be deleted after the container finishes running and any output cohort has been imported into the system. In some embodiments, container images can be purged after a time period, such as thirty days. In some embodiments, containers may not have access to any other files on the host operating system. In some embodiments, containers may not have access to communicate with other containers (e.g., databases or DICOM servers). In some embodiments, containers may not be allowed to communicate with any external service over the Internet. In some embodiments logs collected from the container can be cleaned before sending back to the cloud, such as having sensitive data redacted, log lines truncated, and/or limiting the number of log lines being sent back to the cloud. In some embodiments, there can be limitations on resources (e.g., CPU, GPU, memory, disk space, etc.) to avoid abuse of resources.

The container registry service 138 and docker push command can be used for steps outside of the actual federated learning. Running end-to-end federating learning projects typically involves several steps, including data collection, data preparation, data review, model training and validation, iteration and experimentation on model architectures and hyper parameters, and result analysis. Some of these steps use a federated learning network to coordinate learning across multiple nodes, while others use a mechanism for taking code and running it at each participating site on that site's data (e.g., client agent 102 and associated data). Thus, the container registry service 138 and a docker push command can be used to transmit the container 140 to the client agent 102, where it can be run. In some embodiments, this can be used to facilitate (1) pre-processing or post-processing, such as transforming data in one format into another format, filtering rows, altering column data, performing data imputation, normalizing data, etc.; (2) model validation, such as taking a model and a validation set and running a model inference for each row in the validation set, adding the predicted values to each row, and comparing those to a ground truth; and (3) federated querying, such as performing data aggregation at multiple sites to understand data distributions or other data queries. In some embodiments, the container registry service 138 may contain pre-built containers for common tasks like converting between common data types (e.g. DICOM to png), or general purpose tasks (e.g. receiving one or more lines of code and running them on selected cohorts at each site).

In some embodiments, the system (e.g., via server 106) can provide various model results analysis and visualization features. After training a model, the performance of the model can be measured, such as by running an inference on a set of validation/test cohorts. In addition, the system 100 can provide the ability to analyze and visualize model results. For example, the system 100 can provide a set of standard reports and visualizations for analyzing results of models based on the model type (e.g., there could be a different set of reports/visualizations for binary classification models vs. image segmentation models). The system 100 can also provide the ability to perform custom analysis and can generate custom visualizations for a model. Such analysis and visualization can be made available to users both through the cloud web user interface, as well as through the programmatic user interface.

Additionally, the system 100 can provide experiment management functionality. Often, researchers may perform multiple different training runs for their models, rather than a single training run. The different training runs may be on different cohorts, different model hyper-parameters, different model architectures, and any combination thereof, as well as other possibilities. The system 100 can allow users to trigger many of these training runs (i.e., "experiments"), track their progress over time, and, once they are complete, compare the performance of the different experiments. For example, the user may wish to select the best training regimen or hyper parameter values.

The system 100 also includes versioning capabilities. For example, the system 100 can track the different versions of objects in the system, such as data schemas, cohorts, models, etc. This is often beneficial because cohorts can evolve over time (e.g., by adding more data points, performing normalization and/or data imputation, etc.), as can data schemas and models. When training different versions of models or training a model on different cohorts, it can be helpful to known which version is being utilized. This is also helpful when retraining models with additional data as it helps inform which cases were included in the original training. This can prevent data duplication in the training/validation sets and help make sure data is not added that was previously used for training.

Figure 2A:
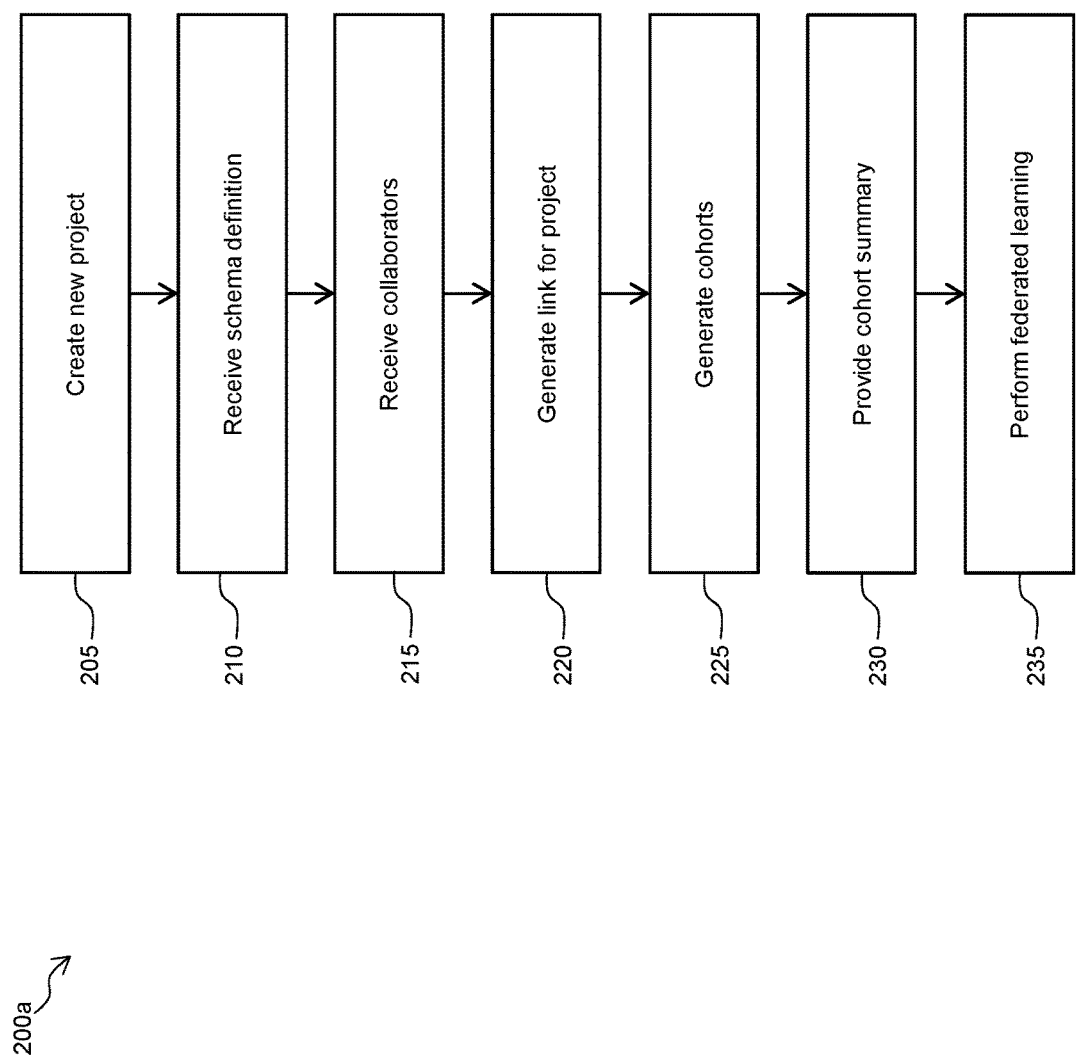
FIGS. 2A and 2B are example processes that can be performed within the system of FIG. 1, according to some embodiments of the present disclosure.
Figure 2B:
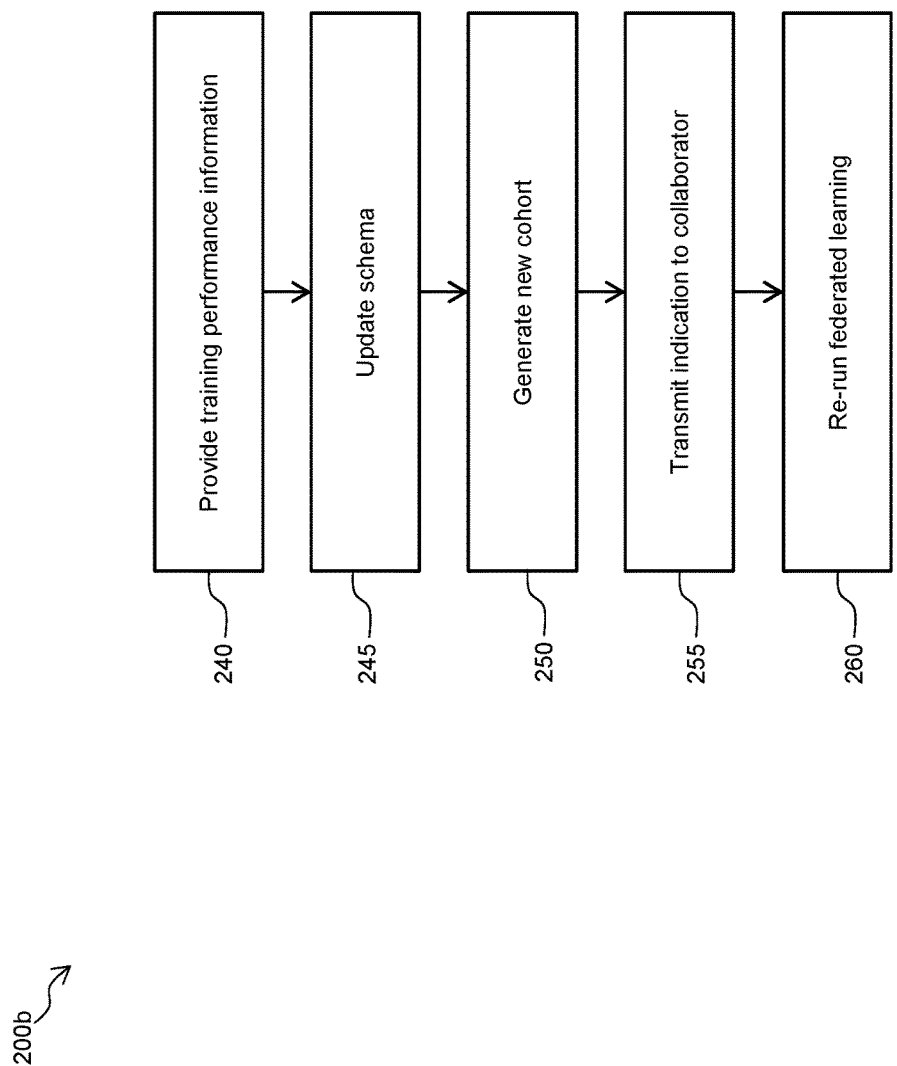

FIGS. 2A and 2B are example processes that can be performed within the system of FIG. 1, according to some embodiments of the present disclosure. In particular, FIG. 2A shows process 200a, which details the process of setting up a research collaboration between a first location and a second location and using federated learning to train a model. For example, the first location can be a research lab within a hospital, and the second location can be a different lab at a different hospital, perhaps in another state. Prior to process 200a being performed, a client agent 102 is installed and established at each location. For example, client agent software can be installed on local servers at each respective location, which includes setting up a VPN account (e.g., for debugging purposes and updates). This can also include setting up various containers, initiating the databases (e.g., databases 114 and 120 and servers 112 and 118). In some embodiments, the installation procedure can be done using an installation script for repeatability. Additionally, organizations, workgroups, and user accounts can also be defined. As described herein, an organization refers to an entity working with the entity that manages the system 100. Organizations can include hospitals, model developers, etc. Organizations can also include one or more workgroups. A workgroup can refer to a department/team within an organization. In this case, where client agents 102 at two locations are being used, the agents will be referred to as client agent 102a at the first location and client agent 102b at the second location.

At block 205, the project management service 124 creates a new project based on an indication received from a user device 136a. The indication can have been sent based on a user (e.g., an employee or researcher at the first location) interacting with a web interface that allows him/her to specify the project name, description, and type. Project management service 124 also assigns the project to a workgroup associated with the user. At block 210, the project management service 124 receives a schema definition from the user device 136a. The schema has been defined by the user, generated by a project lead, or derived from the dataset. For example, the user can have created a CSV (or similar) file that describes the fields. The project management service 124 also receives a schema name and description that the user specified via the web user interface.

At block 215, the project management service 124 receives collaborators from the user device 136a. For example, the user can have added various individuals, such as a researcher that works at the second location (herein referred to as a "second user") or a workgroup or organization that this second user belongs to. At this step, in some embodiments, the project management service 124 can also receive data privacy and permission settings for the second user, as defined by the first user. At block 220, the project management service 124 generates a link to the project, which can be transmitted to the user device 136a and shared by the first user to various collaborators. In some embodiments, the project management service 124 can share the link directly to a pre-defined medium, such as a Slack channel or email message. In some embodiments, the server 106 is operable to receive a project permission configuration for one or more collaborators from a user device 136. The collaborators can approve the permission configuration and can define specific permissions for their data within the relevant project. The system then forces these permissions, such as for the duration of the project.

At block 225, the project management service 124 receives a request from user device 136a to import a cohort. This request is transmitted to client agent 102a via network 104 to perform the data import. For example, the project management service 124 receives a request to import a first dataset from the user at the first/main location. The project management service 124 generates a cohort object placeholder for the first dataset and associates the cohort object placeholder with the schema defined at block 210 and the project created at block 205. These can be stored in Cloud DB 134. The project management service 124 then sends an import command to client agent 102a, which imports the cohort data from the first dataset locally, validates that it conforms to the schema defined at block 210, and then creates a cohort object in local DB 120, associated to the cohort object placeholder via a shared unique identifier. In addition, the project management service 124 receives a request from user device 136b to import a cohort. For example, the second user uses user device 136b to request a cohort import at the second location. The project management service 124 sends an import command to client agent 102b, which imports a second cohort object from the second dataset and associates the second cohort object with the same schema and project definition. Additional details on cohort generation are discussed in relation to FIG. 3. The cohorts are stored in the respective databases at each location (e.g., local DICOM database 114a and local Postgres database 120a for the first cohort and local DICOM database 114b and local Postgres database 120b for the second cohort). In this manner, respective data is secured by not leaving the relevant hospital network.

At block 230, each client agent 102 (or the server 106 directly) provides a cohort summary for display, e.g. via a web interface accessible by user devices 136a and 136b. In some embodiments, the cohort summary displayed can include a summary of all cohorts associated with the project. For example, a user could view high level statistics about the cohorts (both separately and altogether), including the number of cases, how many cases are missing annotations, the distribution within the cohort of variables (e.g., device type, patient gender, etc.), average of a specific variable value among cases, or how many rows were missing data for each field in the schema. For example, if the first user wishes to view statistics for the second cohort (which is not stored at databases on the first location's network), the project management service 124 can access the client agent 102b, obtains the aggregate statistics about the cohort, merges the information, and runs an "apply privacy" method on the statistics.

In some embodiments, a client agent 102 can export a cohort to a location specified by a user. In some embodiments, the location in which the cohort is exported to must be accessible to both the user and the associated client agent 102. The server 106 connects to the client agent 102 and runs the export operation and performs the actual export of data. For example, a user may wish to export a cohort to add in missing annotations.

At block 235, the FL orchestration service 126 performs a federated learning process using the cohorts generated at block 225. For example, the FL orchestration service 126 receives a request from user device 136a to perform federate learning using cohorts that have been imported to client agent 102a and client agent 102b. The user provides code (e.g. via a docker container) to use for model training. The FL orchestration service 126 creates a new FL Server within server 106, and sends commands to client agents 102a and 102b to create new FL Clients. In some embodiments the FL Clients will have communication limited to only allow communication with the FL Server used for their training run. In some embodiments client agents 102 operate as the federated learning clients, and the server 106 operates as the federated server. In some embodiments, the FL orchestration service 126 sends a request to client agents 106 to export the cohort data to a local directory and make it accessible to the FL Client containers. In some embodiments, an adapter can be used that will allow the federated learning process to interact with the data without requiring it to be exported from the system 100. In some embodiments, the FL orchestration service will trigger the training process once the FL Server and FL Clients have all been created and connected successfully. In some embodiments, once the training is complete, the first user can import the training results (e.g., from all client agents 102) into the system 100 via the web user interface at his/her workstation. In some embodiments, once the training is complete, the FL orchestration service automatically imports the training results, making the global model parameters available to download via server 106. In some embodiments, several versions of the model parameters from different stages of the training process can be stored in server 106 and made available for download. In some embodiments, after training has completed, the FL orchestration service will automatically send a request to client agents 102 to perform validation by using global model parameters and running model inference on specified validation cohorts that have been imported to the different client agents. The first user defines an object for the machine learning model object that represents the actual model container. A name and description can be defined.

FIG. 2B is an optional process 200b that can be performed after the completion of process 200a in FIG. 2A. At block 240, the server 106 provide training performance information for display on a user interface of the first user (e.g., on his/her workstation). For example, the server 106 can obtain performance statistics (for each site separately and for the global model) from each client agent 102 that participated in the training, such as precision-recall curves and other performance metrics and additional ancillary data generating during the training of a model, loss-cases, a list of errors encountered during training, etc. The information can be merged, have a privacy filter applied (e.g., merging/removing groups with less than a certain number of data points), and displayed via the web user interface. In addition, the server 106 can cause cohort losses or loss-cases to be displayed on the user interface. In some embodiments, the first user can view a sample of the local cohort losses or loss-cases from the first cohort and remotely view (with permission) losses from the second cohort. In a specific example of a stroke detection model, the first user may view images from the losses and notice that they are images from a specific type of stroke that usually coincides with a specific artifact easily identified in a blood test, the results of which are easily available to physicians when they analyze CT results. The first user may decide that they wish to add this blood test result as a feature to the model to see if it will improve performance.

At block 245, the project management service 124 updates the project schema based on information specified by the first user. For example, the first user may take the existing schema CSV, add a new variable (i.e., the blood test result or any other desired variable), and upload the new schema. The project management service 124 then creates a new schema object. At block 250, the project management service 124 imports a new cohort. In other words, the project management service 124 receives a request to import a cohort from an updated dataset accessible to client agent 102a that includes the addition of the new variable discussed above. At block 255, the server 106 transmits an indication to the second user indicating that a new schema was formed and notifying him/her that a new cohort should be imported. The project management service 124 then receives a new cohort import request from the collaborators in the project (e.g., the second user and user device 136b), and performs an import of the updated cohort (e.g. into client agent 102b). At block 260, the FL orchestration service 126 performs a federated learning process using the cohorts generated at blocks 250 and 255.

FIG. 3 is an example process 300 for creating a cohort, according to some embodiments of the present disclosure. In some embodiments, process 300 can be performed at blocks 225 of process 200a and block 250 of process 200b. At block 305, a client agent 102 receives a dataset, such as from a hospital file storage system. In some embodiments, the dataset can include a CSV file (or other similar data type) with a list of IDs for each case and all other information necessary for the model inputs, outputs, and metadata. In some embodiments, receiving the dataset can also include receiving DICOM data for all the IDs/cases to be stored in the raw local DICOM server 112. At block 310, the client agent 102 verifies permissions associated with the receiving of the dataset. For example, the client agent 102 can test the connection to the raw local DICOM server 112 and attempts to open the CSV. If just a path was provided, then there is an assumption that this path is accessible by the client agent 102. If the file was provided in its entirety as an argument and is stored locally by the client agent 102, then the client agent 102 verifies that it has access to the imaging data (i.e., DICOM images) and the CSV data file.

At block 315, the client agent 102 validates the dataset with the relevant schema. Validating the dataset can include going through each of the fields defined in the schema and determining if each entry in the CSV matches this set of fields. In some embodiments, the client agent 102 can run validation of a schema field including field validation parameters, e.g. a minimum and/or maximum value. At block 320, in response to a successful validation, the client agent 102 copies the data. For example, the CSV data can be imported into the raw Postgres server 118 and the DICOM data can be imported into the local raw DICOM server 112. It is important to note that, in some embodiments, a schema may not be used. In these embodiments, validation steps are not performed.

At block 325, the client agent 102 de-identifies the data from the dataset. In some embodiments, de-identifying the data can include one or more of automatically stripping/pseudonymizing standard DICOM tags, stripping/pseudonymizing DICOM private tags based on user configuration (e.g., a whitelist of private tags to preserve), and stripping/pseudonymizing CSV columns based on metadata provided for those columns. DICOM images can undergo a de-identification process (e.g., using a standard library). Specific deidentification logic can be defined by the user in the schema and transmitted to client agent 102 to be used during this deidentification process. In one example, the pseudonymized procedure can remove a birthyear if the person is over 90 and set the birthyear to a specific value denoting 90+. At block 330, the client agent 102 stores copies of the de-identified data. In some embodiments, the de-identified/pseudonymized data is a copy of the original data and the original data is left untouched and accessible by the system 100. The pseudonymized DICOM data and other metadata can be stored in the local clean DICOM database 114 and the pseudonymized CSV data can be stored in the clean Postgres database 120. Any reverse lookup tables (e.g., matching original identifiers to new identifiers) can be stored in the raw Postgres server 118 with the original data. In some embodiments, if de-identified data is provided in block 305, then blocks 320 and 325 can be skipped and the data can be stored directly in clean Postgres database 120 and clean DICOM database 114.

Figure 5:
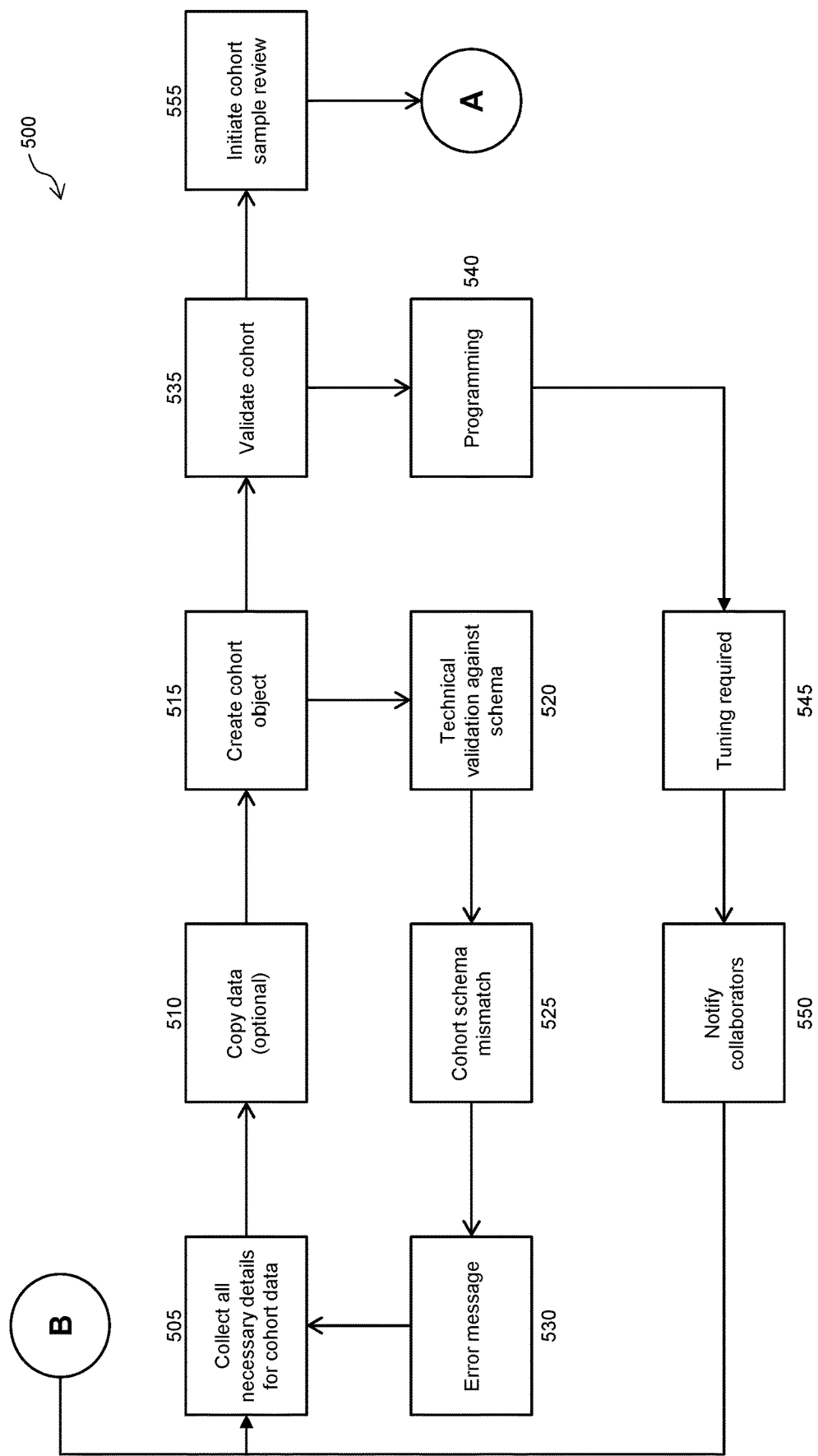
Figure 6:
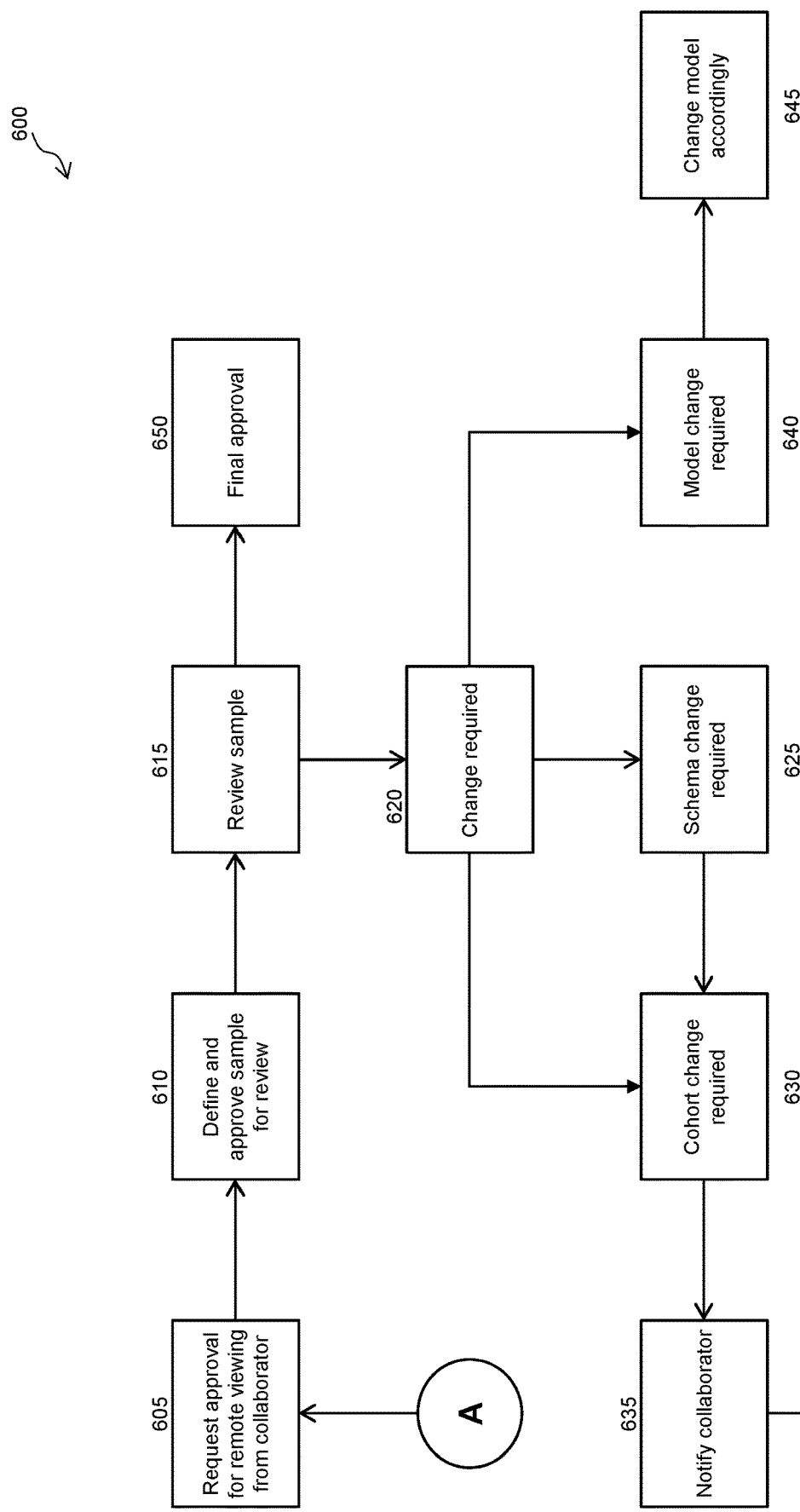

FIGS. 4-6 show example flows for cohort review and tuning, according to some embodiments of the present disclosure. In particular, FIG. 4 shows a user flow 400 for a project leader (i.e., the creator/primary user of a project) to review and tune a cohort. In some embodiments, the various blocks can be performed by the user via a user device connected to the hospital IT system 108. In some embodiments, the various blocks can be performed by the user via user device 136 communicating with server 106. In some embodiments, the various blocks can be performed by the user via a mix of using user device 136 and using a device connected to the hospital IT system 108. At block 405, the user collects all necessary details for cohort data, including the various inputs, outputs, and metadata. In some embodiments, this can be in the form of a CSV or other similar type of file. At block 410, the user can optionally copy the data into the client agent 102. At block 415, the user, via a user interface to access the platform, creates a cohort object (i.e., imports a cohort). At block 420, the client agent 102 performs a technical validation of the cohort against the schema that the user had already defined. At block 425, the client agent 102 detects a cohort schema mismatch. For example, one or more data points may have an incorrect format, may have one or more fields missing, or, in the case of DICOM files, may be missing an annotation or label. At block 430, in response to detecting the cohort schema mismatch, the client agent 102 generates an error message to the user detailing the mismatch. From here, the user can modify and fix the cohort data and repeat blocks 405-415.

Once the client agent 102 has determined that there are no cohort schema mismatches, the client agent validates the cohort at block 435. At block 440, the user can run his/her computation processes on the cohorts. This can include "generalized compute" or running any number of code steps such as preprocessing and model inference, as well as federated training tasks. Upon analysis of the results from block 440, tuning may be required (445). At 450, collaborators are notified if tuning is required.

FIG. 5 shows a user flow 500 for a collaborator to review and tune a cohort. In some embodiments, various blocks within user flow 500 can be performed at a collaborator device that is on the network of his/her respective hospital network, which is a different network than the project leader's. In some embodiments, the various blocks can be performed by the user via their user device, which is different than the user device of the project leader, communicating with server 106. In some embodiments, the various blocks can be performed by the user via a mix of using their user device and using a device connected to the hospital IT system of their hospital network. At block 505, the collaborator collects all necessary details for cohort data, including the various inputs, outputs, and metadata. In some embodiments, this can be in the form of CSV or other similar type of file. At block 510, the collaborator can optionally copy the data into his/her associated client agent 102 (a separate client agent than the project leader's). At block 515, the collaborator, via a user interface to access the platform from his/her own network, creates a cohort object (i.e., imports a cohort). Blocks 520-530 are the same as or similar to blocks 420-430, where the respective client agent 102 detects mismatches between the project schema and the collaborator's cohort.

At block 535, once the client agent 102 has determined that there are no cohort schema mismatches, the client agent 102 validates the collaborator cohort at block 535. At block 540, the user can run his/her computation processes on the cohorts. This can include "generalized compute" running any number of code steps such as preprocessing and model inference, as well as federated training tasks. Upon analysis of the results from block 540, tuning may be required (545). At 550, collaborators are notified if tuning is required.

At block 555, the user initiates a cohort sample review, which takes processing into FIG. 6. At block 605, the project leader requests approval for remote viewing from the collaborator. At block 610, the collaborator can define and approve a sample of the collaborator cohort for remote reviewing by the project leader. At block 615, the project leader reviews the sample via his/her own user device. In some embodiments, the project leader may identify an issue or problem with the sample. In other words, the project leader may, at block 620, indicate that a change is required. Various changes are possible. For example, the project leader can determine that a schema change is required (block 625), which in turn would also require a cohort change (block 630). At block 635, the collaborator is notified that such changes are necessary. Alternatively, the project leader may only identify that a cohort change is required (block 635), which takes processing back to the beginning of flow 500 so the collaborators can implement the changes. Another alternative is that the collaborator determines that a model change is required (block 640), in which case the model is changed accordingly by the project leader at block 645. If no changes are identified as being required by the project leader, then final approval is given at block 650.

Figure 7:
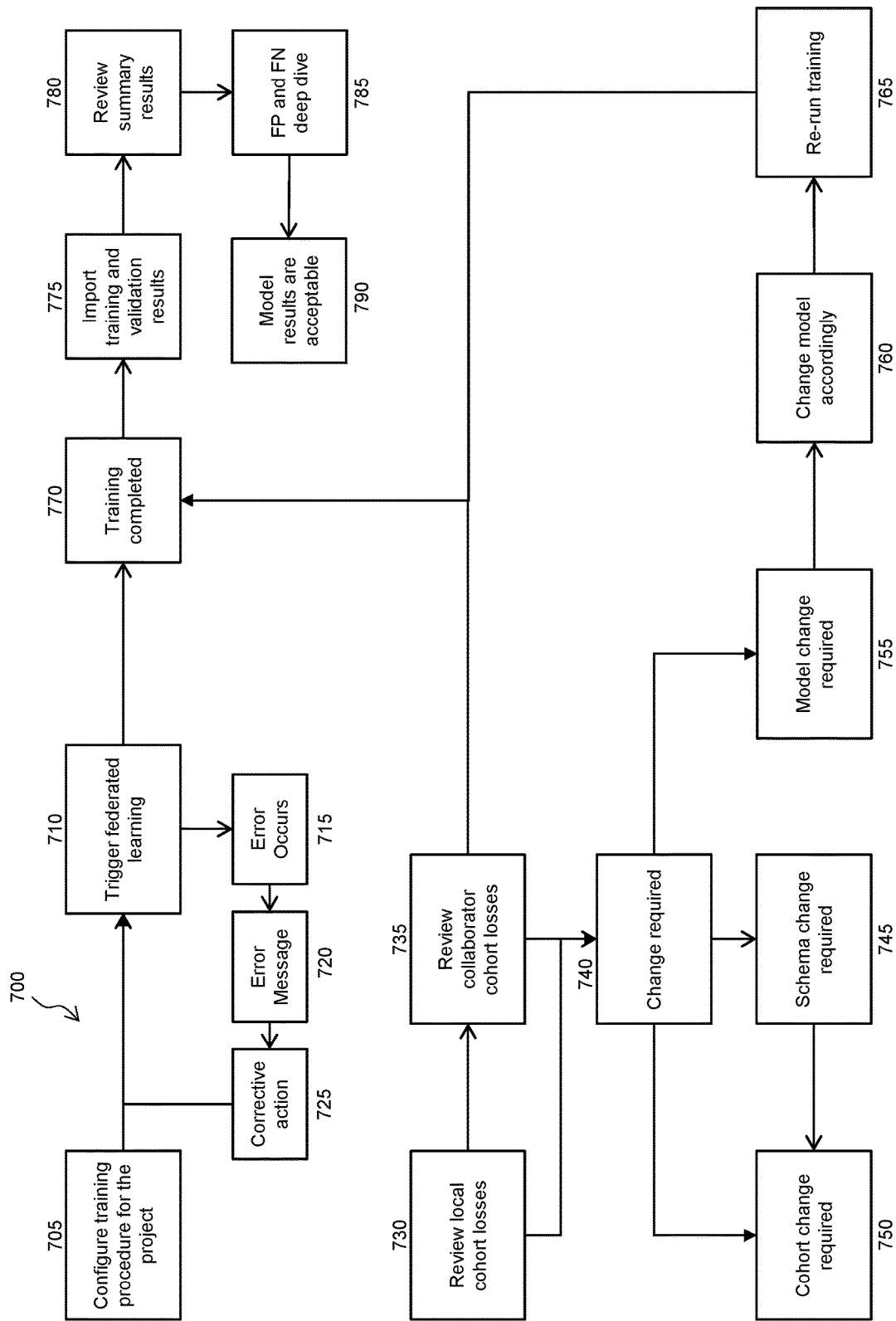
FIG. 7 shows an example flow for model training and tuning, according to some embodiments of the present disclosure.

FIG. 7 shows an example flow 700 for model training and tuning, according to some embodiments of the present disclosure. At block 705, a user (e.g., a project leader) configures the training procedure for the project. At block 710, the user triggers a federated learning process using the project leader-supplied cohort and one or more collaborator cohorts. At blocks 715-725, the possibility of some configuration error in the model definition, data access permissions, or other definitions is indicated, which would trigger an error message at block 720. At block 725, a corrective action would be taken.

At block 770, the training process finishes running and validation is performed on the validation cohorts. At block 775, the training and validation results are imported into the system (either automatically or via a user generated request to import results) and, at block 780, the project leader reviews summary results. At block 785, the project leader can manually review training metrics and loss cases, e.g. false negatives (FNs), false positive (FPs). At block 730, the project leader reviews local loss-cases, which refer to poor model performance on specific cases in the project lead's cohort. For example, in a binary classification task, a loss-case would be false positives and false negatives. In other words, the project leader reviews losses from their own cohort of data. At block 735, the project leader can then review collaborator loss-cases, which may result in the project leader determining that a change is required at block 740. If a change is required (similar to the processing in flow 600 of FIG. 6), the project leader may determine that (1) a schema change and thus a cohort change are required (blocks 745 and 750); (2) only a cohort change is required (block 750); and/or (3) a model change is required (block 755). If a model change is required, processing proceeds to block 760 where the project leader can change or tune the model accordingly. At block 765, the project leader can re-run the federated learning/training process. In some embodiments, if no changes are determined to be required while the project leader reviews summary results at block 780 and/or loss-cases at block 735, the model results can be determined as acceptable at block 790.

Figure 8:
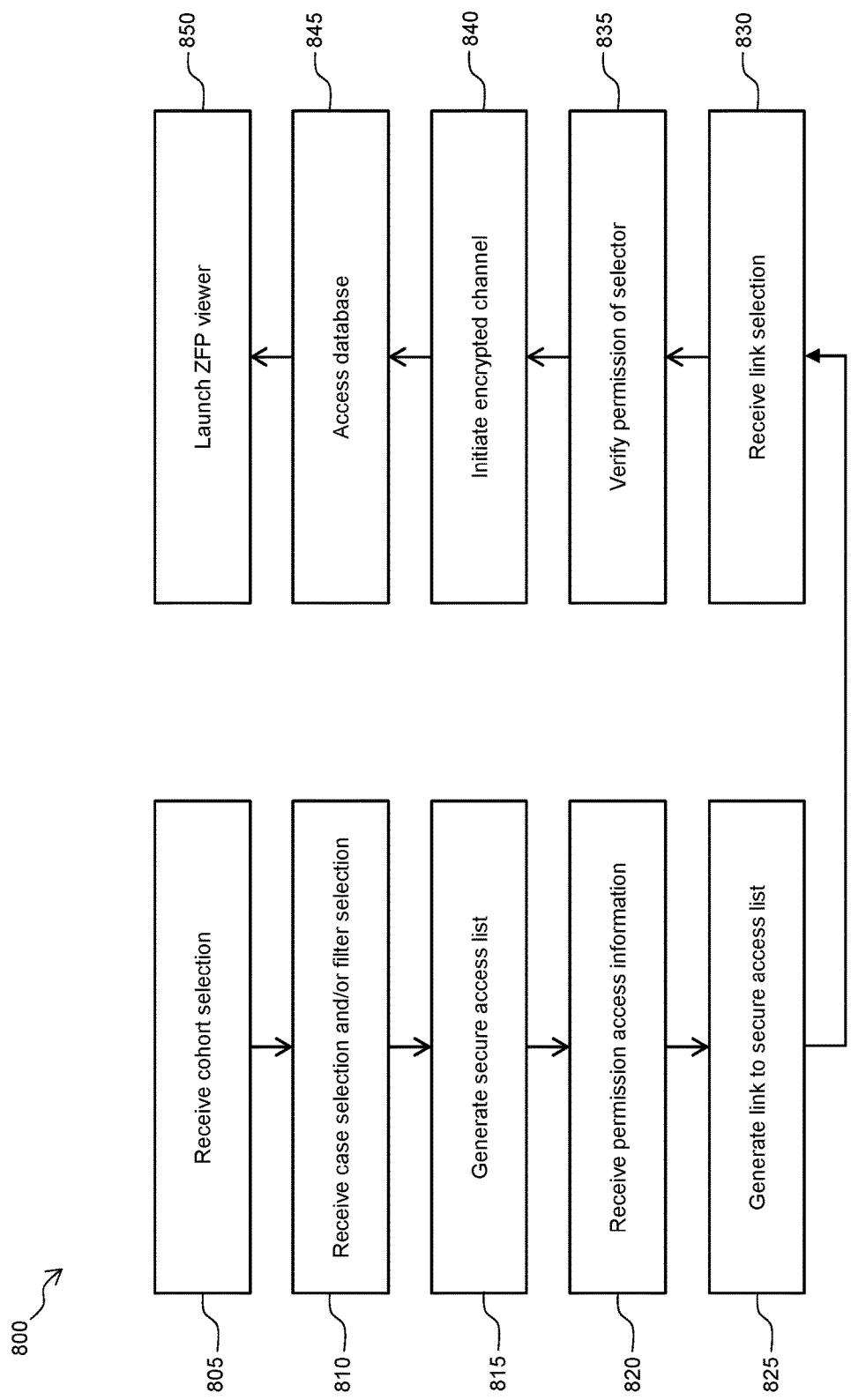
FIG. 8 shows an example process for providing secure access, according to some embodiments of the present disclosure.

FIG. 8 shows an example process 800 for providing secure access, according to some embodiments of the present disclosure. As described herein, secure access can be a way for various users (e.g., collaborators or project leaders) to view tabular, imaging data, file data, video data, HER data, graph data, or streamed data that resides outside the users' network in a cloud-based UI in a secure manner. For example, a project leader may wish to perform a sanity check or data quality assurance on a collaborator's cohort without compromising the privacy and integrity of the data set and without the data being stored, even transiently, outside of its network. In some embodiments, the server 106 will connect to the necessary client agent 102 as a pseudo database so as not to save any cohort and DICOM data out of site.

At block 805, a first user device 136a receives a cohort selection. For example, a user, via their laptop connected via the platform's user interface (e.g. a web UI) to server 106, may select a cohort, or select specific cases from within a cohort, to be shared with specific collaborators. This selection is transmitted from the user device 136a to server 106 via the web UI. At block 810, the server 106 receives selected cohort and any filter criteria and/or case. For example, a case selection can include the user selecting, via the platform's user interface, select individual cases from a list within the cohort to be shared. In addition, the platform, via a user interface, can provide various filtering tools for selecting cases, such as numeric filters, Boolean filters, string filters, enum filters, time filters, and specific ID filters. In some embodiments, the platform can display the total number of selected cases. In some embodiments, the platform can allow the user to filter out (from display) all unselected cases.

At block 815, the server 106 validates that the user is authorized to perform an action of creating a secure access list for the cohort selected in block 810, and can then send a request to client agent 102a to validate that the cohort and case selection are valid. Server 106 can then create a secure access list that includes the cases selected at block 810. In some embodiments, the secure access list can be generated in response to a selection by the user to save the list. In some embodiments, when the secure access list is generated, the platform can prompt the user to input information for the secure access list, such as a name and description. The list is then saved in the cloud, such as at the cloud database 134. At block 820, the server 106 receives a share request for the secure access list. For example, the user, via the platform's user interface, can select collaborators, workgroups (or other subsection) to share access to the secure access list. In some embodiments, the user can also specify a time range for the permission, such as unlimited, 24 hours, 3 hours, custom, etc. At block 825, the server 106 marks the secure access list as shared with the specified parties and associated permission data, and generates a link to the secure access list. The collaborators can be notified via some medium (e.g. Slack or email) or within the platform's user interface that a new secure access list has been shared with them.

At block 830, the server 106 (via a second user device 136b) receives a request to view the contents of the secure access list link. For example, a user other than the user who created the secure access list may have been provided the link for viewing purposes. At block 835, the server 106 verifies that the selector has permission to view the secure access list. For example, the server 106 can verify that the selector is part of the workgroup specified at block 820 (e.g., via a UID or similar data type). At block 840, an encrypted channel (e.g., https) can be initiated between user device 136b and server 106. Another encrypted channel can be initiated between server 106 and client agent 102b. Another encrypted channel can be initiated between client agent 102b and local DB 120b and/or local DICOM server 114b. These encrypted channels can be configured to tunnel bitstreams of imaging and other data. In some embodiments, the encrypted channel that is established between the client agents 102a-b and the server 106 (and the cloud environment in general) can be a remote procedure call (RPC) channel. The set of encrypted channels can act as a proxy/passthrough that allows only verified requests to move between user device 136b and client agent 102b. Therefore, once the encrypted channel is initiated, at block 845, the user device 136b can make requests to view data that is stored in a database (e.g., a DICOM server database) associated with client agent 102b, which can be either the local DICOM database 114b and/or the local Postgres database 120b. At block 850, the platform's user interface launches a launches a zero footprint (ZFP) viewer on user device 136b to view the secure access list. This viewer can be configured to not store any data locally on the user's workstation or laptop. In this case no data is ever stored outside of the client agent 102b—only sent and viewed transiently. In some embodiments, the viewer can be an Open Health Imaging Foundation (OHIF) viewer or another similar viewer for viewing medical and DICOM images. In some embodiments, the user can display tabular data including numbers and/or strings in the ZFP viewer. In some embodiments, the viewer can display image data (e.g. png, jpg). In some embodiments users can specify a custom data viewer to be used to visualize the data (e.g. a In some embodiments, the viewer can include one or more of: (1) object segmentation support; (2) an in-tool ability to review studies, (3) an in-tool ability to select series within the studies, (4) an in-tool ability to provide a comment about a specific; and (5) an in-tool ability to create annotations.

Users can access the platforms user interface to perform actions like viewing and managing secure access lists that they have shared or had shared with them, with options for modifications and deletions. In some embodiments, a user can reference and search specific rows for single cases based on a UID. In some embodiments, the audit trail service 132 is configured to log secure access list creations, modifications, deletions, shares, ending of shares, share approvals, lists accessed, images opened, and cohorts opened.

Figure 9:
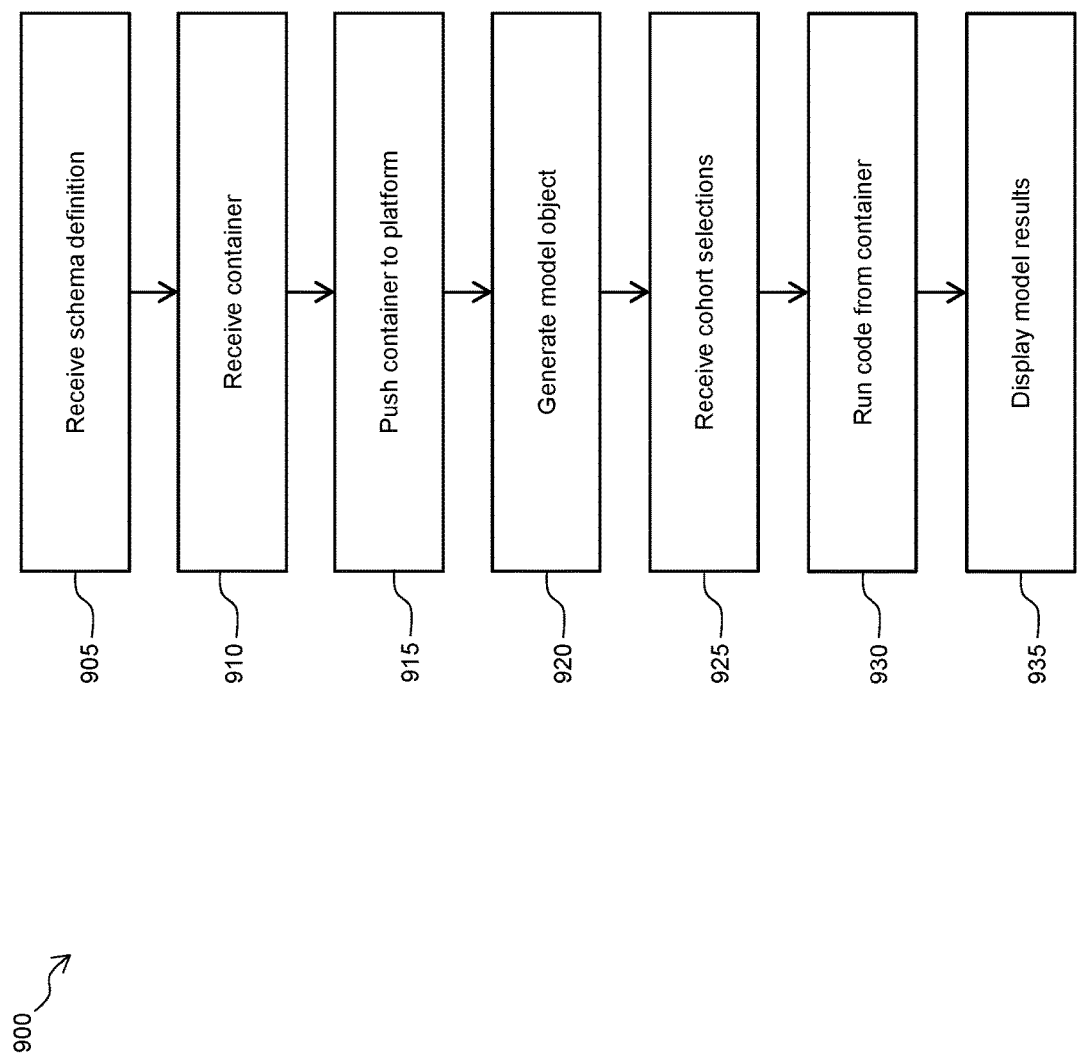
FIG. 9 shows an example process for providing flexible distributed computation, according to some embodiments of the present disclosure.

FIG. 9 shows an example process 900 for providing flexible distributed computation, according to some embodiments of the present disclosure. In some embodiments, process 900 can be performed to run various pieces of code across different participating sites (e.g., different collaborating hospitals and/or institutions). For example, pre-processing, model validation, and federated querying can be computed in a flexible and distributed manner. At block 905, server 106 receives a schema definition from a user (e.g., a project leader that developed a model being trained via federated learning), which can be uploaded/inputted via user device 136a. The schema defines the format of the input and output of the code that needs to be executed in a distributed manner. At block 910, the server 106 receives a container, such as a Docker container. The container includes the code to be executed, such as a pre-processing algorithm to be run on various cohorts. In some embodiments, the server 106 can alternatively build a container based on code received from the user. The container is pushed to the server 106 by the user. For example, the server 106 can utilize the container registry 138 and the user can initiate a Docker push command to push the container to the container registry 138.

At block 920, the server 106 generates a model object linked to the container as a result of a request from user device 136 via the platform's user interface. At block 925, the server 106, via user device 136, receives cohort selections from the user. For example, the user can select various collaborator cohorts (or his/her own cohort) that the code will be executed on. At block 930, a request is transmitted from server 106 to client agents 102 at which the selected cohorts exist to run the code. The client agents read the container image from the container registry 138, then run the code on the selected cohorts within the client agent (in other words—the code is executed "on-premises" or "on-site" for each selected cohort). In some embodiments, the cohort data is exported to a local directory and make it accessible to the container. In some embodiments, an adapter can be used that will allow the container to interact with the data without requiring it to be exported from the system 100. In some embodiments, once the container code finishes running, the result of the container code is accessed by client agent 102 (e.g. as files in a specific directory) and can be imported into the client agent 102 in different ways, for example as a cohort with or without DICOM data and/or other data types. In some embodiments, the container code is limited to accessing only the input cohort data on the filesystem. In some embodiments, the container code is prevented from performing communication with any other service in client agent 102 (e.g. databases or DICOM servers). In some embodiments, the container code is prevented from performing any communication with external systems. In this manner, the code is executed "on-premises" or "on-site" for each selected cohort in a safe and secure manner, preventing data leakage and/or access to unauthorized resources, and sensitive data is prevented from leaving its associated network. At block 935, the server 106 can display code output on the user device 136 via the platform's user interface, which can include summary statistics of the output cohort and a numeric output per case of the selected cohorts.

FIGS. 10A-10B show example processes 1000A-B for encrypted federated learning, according to some embodiments of the present disclosure. Process 1000A can be a process performed by the server 106 of FIG. 1. In addition, process 1000B can be a process performed by a client agent 102. In some embodiments, processes 1000A-B can be performed in accordance with the processes described in FIGS. 2A-2B and FIG. 9, as well as in conjunction from each other. In other words, the server 106 and a client agent 102 can perform processes 1000A and 1000B together to accomplish an encrypted federated learning process.

At block 1005, the server 106 receives encrypted code from a user device 136. In some embodiments, the encrypted code can be encrypted model code or an encrypted container. At block 1010, the server 106 receives a code key from the user device 136. At block 1015, the server 106 transmits the code key and the encrypted code to the client agent 102. In some embodiments, the code key can be provided to the client agent 102 via an external key management system. At block 1020, the server 106 initiates a federated learning process. In some embodiments, the federated learning process can be the same as or similar to the federated learning of block 235 in process 200. For example, the FL orchestration service 126 can create a new FL Server within server 106 and sends commands to client agents 102a and 102b to create new FL Clients.

At block 1025, the server 106 receives model weights from the client agent 102 (or from multiple client agents if there are multiple). At block 1030, the server 106 encrypts the model weights. In some embodiments, the server 106 can encrypt the model weights with a weight key, which can also be obtained via a key management system. In some embodiments, the model weights can be encrypted via an encryption scheme (e.g., homomorphic encryption) while they are in transit between the client agent(s) 102 and the server 106. At block 1035, the server 106 stores the encrypted model weights, such as in the cloud DB 134.

Process 1000B begins at block 1040. At block 1040, a client agent 102 receives the encrypted code from the server 106. At block 1045, the client agent 102 receives the code key from the server 106. At block 1050, the client agent 102 decrypts the encrypted code with the code key. At block 1055, the client agent 102 executes the decrypted code. In some embodiments, the client agent 102 can execute the decrypted code on a central processing unit (CPU) or a graphics processing unit (GPU) or in a Trusted Execution Environment. At block 1060, the client agent 102 transmits the model weights to the server 106.

Figure 11:
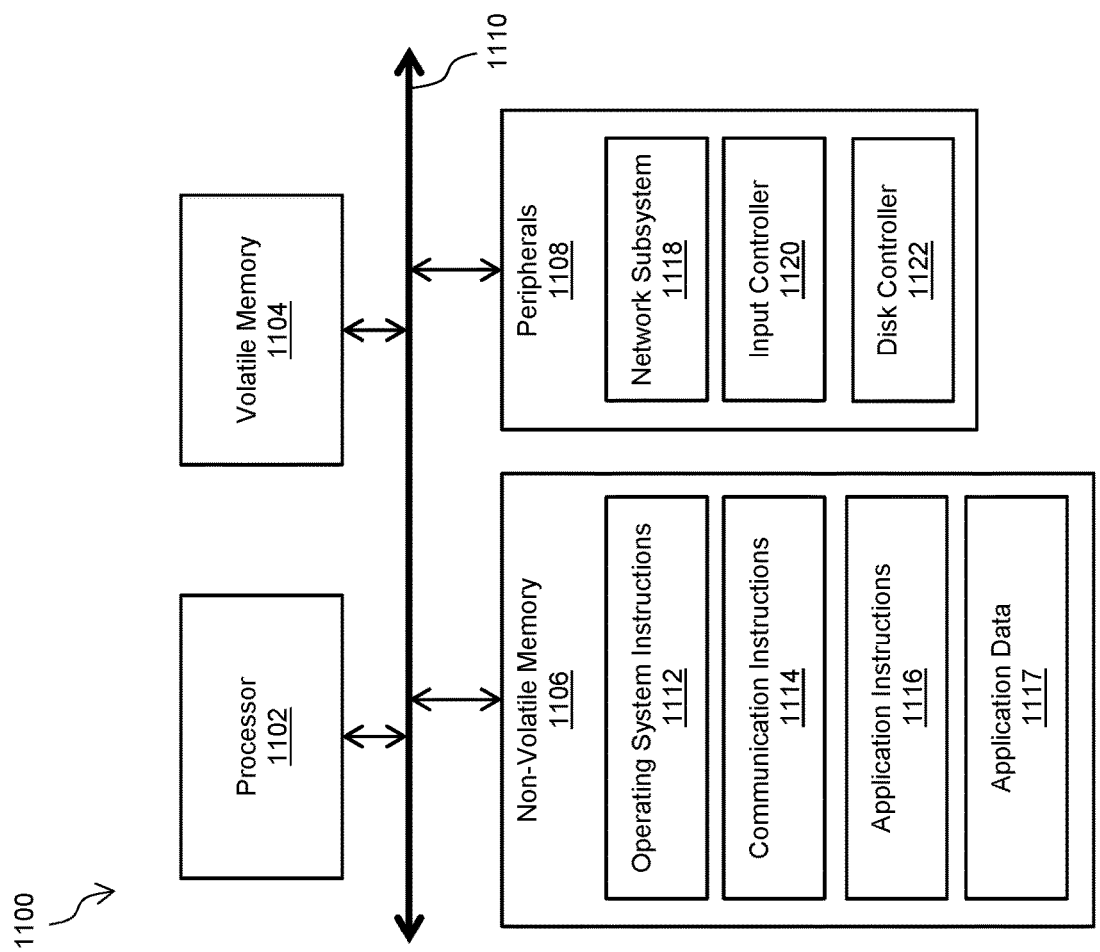
FIG. 11 is an example server device that can be used within the system of FIG. 1 according to an embodiment of the present disclosure.

FIG. 11 is a diagram of an example server device 1100 that can be used within system 100 of FIG. 1. Server device 1100 can implement various features and processes as described herein. Server device 1100 can be implemented on any electronic device that runs software applications derived from complied instructions, including without limitation personal computers, servers, smart phones, media players, electronic tablets, game consoles, email devices, etc. In some implementations, server device 1100 can include one or more processors 1102, volatile memory 1104, non-volatile memory 1106, and one or more peripherals 1108. These components can be interconnected by one or more computer buses 1110.

Processor(s) 1102 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 1110 can be any known internal or external bus technology, including but not limited to ISA, EISA, PCI, PCI Express, USB, Serial ATA, or FireWire. Volatile memory 1104 can include, for example, SDRAM. Processor 1102 can receive instructions and data from a read-only memory or a random access memory or both. Essential elements of a computer can include a processor for executing instructions and one or more memories for storing instructions and data.

Non-volatile memory 1106 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 1106 can store various computer instructions including operating system instructions 1112, communication instructions 1114, application instructions 1116, and application data 1117. Operating system instructions 1112 can include instructions for implementing an operating system (e.g., Mac OS®, Windows®, or Linux). The operating system can be multi-user, multiprocessing, multitasking, multithreading, real-time, and the like. Communication instructions 1114 can include network communications instructions, for example, software for implementing communication protocols, such as TCP/IP, HTTP, Ethernet, telephony, etc. Application instructions 1116 can include instructions for various applications. Application data 1117 can include data corresponding to the applications.

Peripherals 1108 can be included within server device 1100 or operatively coupled to communicate with server device 1100. Peripherals 1108 can include, for example, network subsystem 1118, input controller 1120, and disk controller 1122. Network subsystem 1118 can include, for example, an Ethernet of WiFi adapter. Input controller 1120 can be any known input device technology, including but not limited to a keyboard (including a virtual keyboard), mouse, track ball, and touch-sensitive pad or display. Disk controller 1122 can include one or more mass storage devices for storing data files; such devices include magnetic disks, such as internal hard disks and removable disks; magneto-optical disks; and optical disks.

Figure 12:
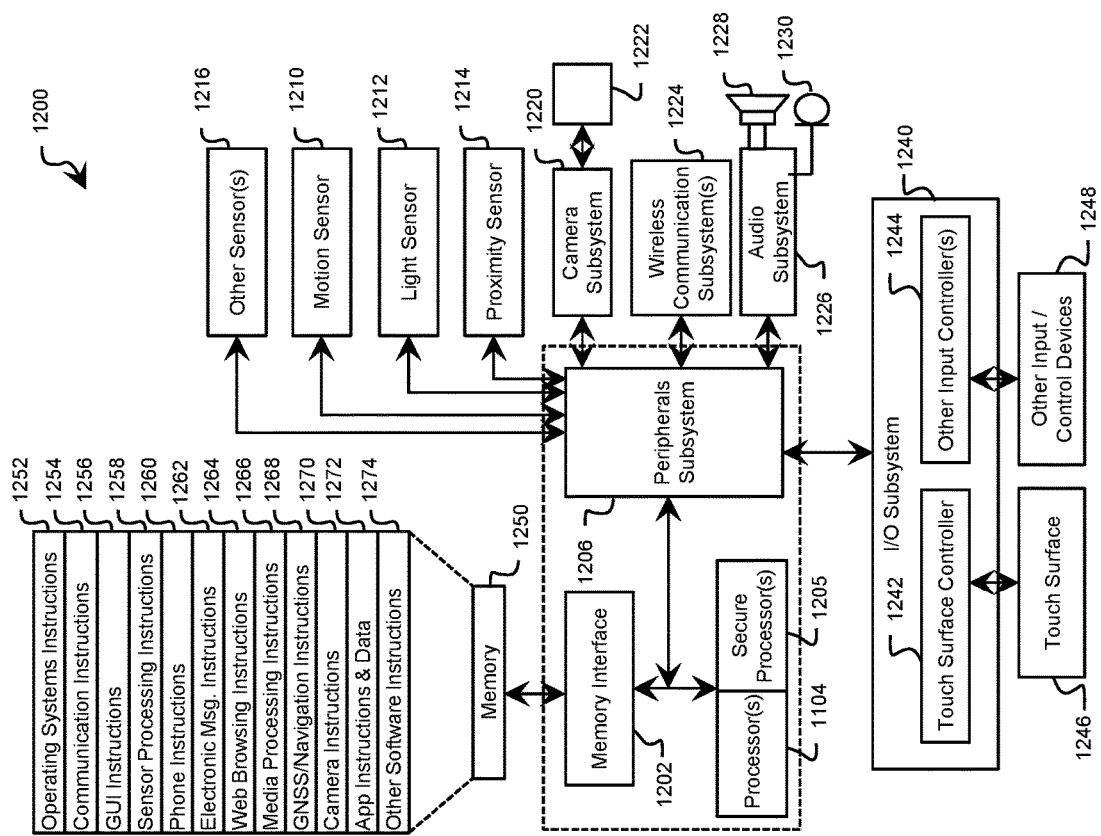
FIG. 12 is an example computing device that can be used within the system of FIG. 1 according to an embodiment of the present disclosure.

FIG. 12 is an example computing device that can be used within the system 100 of FIG. 1, according to an embodiment of the present disclosure. The illustrative user device 1200 can include a memory interface 1202, one or more data processors, image processors, central processing units 1204, and/or secure processing units 1205, and peripherals subsystem 1206. Memory interface 1202, one or more central processing units 1204 and/or secure processing units 1205, and/or peripherals subsystem 1206 can be separate components or can be integrated in one or more integrated circuits. The various components in user device 1200 can be coupled by one or more communication buses or signal lines.

Sensors, devices, and subsystems can be coupled to peripherals subsystem 1206 to facilitate multiple functionalities. For example, motion sensor 1210, light sensor 1212, and proximity sensor 1214 can be coupled to peripherals subsystem 1206 to facilitate orientation, lighting, and proximity functions. Other sensors 1216 can also be connected to peripherals subsystem 1206, such as a global navigation satellite system (GNSS) (e.g., GPS receiver), a temperature sensor, a biometric sensor, magnetometer, or other sensing device, to facilitate related functionalities.

Camera subsystem 1220 and optical sensor 1222, e.g., a charged coupled device (CCD) or a complementary metal-oxide semiconductor (CMOS) optical sensor, can be utilized to facilitate camera functions, such as recording photographs and video clips. Camera subsystem 1220 and optical sensor 1222 can be used to collect images of a user to be used during authentication of a user, e.g., by performing facial recognition analysis.

Communication functions can be facilitated through one or more wired and/or wireless communication subsystems 1224, which can include radio frequency receivers and transmitters and/or optical (e.g., infrared) receivers and transmitters. For example, the Bluetooth (e.g., Bluetooth low energy (BTLE)) and/or WiFi communications described herein can be handled by wireless communication subsystems 1224. The specific design and implementation of communication subsystems 1224 can depend on the communication network(s) over which the user device 1200 is intended to operate. For example, user device 1200 can include communication subsystems 1224 designed to operate over a GSM network, a GPRS network, an EDGE network, a WiFi or WiMax network, and a Bluetooth™ network. For example, wireless communication subsystems 1224 can include hosting protocols such that device 1200 can be configured as a base station for other wireless devices and/or to provide a WiFi service.

Audio subsystem 1226 can be coupled to speaker 1228 and microphone 1230 to facilitate voice-enabled functions, such as speaker recognition, voice replication, digital recording, and telephony functions. Audio subsystem 1226 can be configured to facilitate processing voice commands, voice-printing, and voice authentication, for example.

I/O subsystem 1240 can include a touch-surface controller 1242 and/or other input controller(s) 1244. Touch-surface controller 1242 can be coupled to a touch-surface 1246. Touch-surface 1246 and touch-surface controller 1242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 1246.

The other input controller(s) 1244 can be coupled to other input/control devices 1248, such as one or more buttons, rocker switches, thumb-wheel, infrared port, USB port, and/or a pointer device such as a stylus. The one or more buttons (not shown) can include an up/down button for volume control of speaker 1228 and/or microphone 1230.

In some implementations, a pressing of the button for a first duration can disengage a lock of touch-surface 1246; and a pressing of the button for a second duration that is longer than the first duration can turn power to user device 1200 on or off. Pressing the button for a third duration can activate a voice control, or voice command, module that enables the user to speak commands into microphone 1230 to cause the device to execute the spoken command. The user can customize a functionality of one or more of the buttons. Touch-surface 1246 can, for example, also be used to implement virtual or soft buttons and/or a keyboard.

In some implementations, user device 1200 can present recorded audio and/or video files, such as MP3, AAC, and MPEG files. In some implementations, user device 1200 can include the functionality of an MP3 player, such as an iPod™. User device 1200 can, therefore, include a 36-pin connector and/or 8-pin connector that is compatible with the iPod. Other input/output and control devices can also be used.

Memory interface 1202 can be coupled to memory 1250. Memory 1250 can include high-speed random access memory and/or non-volatile memory, such as one or more magnetic disk storage devices, one or more optical storage devices, and/or flash memory (e.g., NAND, NOR). Memory 1250 can store an operating system 1252, such as Darwin, RTXC, LINUX, UNIX, OS X, Windows, or an embedded operating system such as VxWorks.

Operating system 1252 can include instructions for handling basic system services and for performing hardware dependent tasks. In some implementations, operating system 1252 can be a kernel (e.g., UNIX kernel). In some implementations, operating system 1252 can include instructions for performing voice authentication.

Memory 1250 can also store communication instructions 1254 to facilitate communicating with one or more additional devices, one or more computers and/or one or more servers. Memory 1250 can include graphical user interface instructions 1256 to facilitate graphic user interface processing; sensor processing instructions 1258 to facilitate sensor-related processing and functions; phone instructions 1260 to facilitate phone-related processes and functions; electronic messaging instructions 1262 to facilitate electronic messaging-related process and functions; web browsing instructions 1264 to facilitate web browsing-related processes and functions; media processing instructions 1266 to facilitate media processing-related functions and processes; GNSS/Navigation instructions 1268 to facilitate GNSS and navigation-related processes and instructions; and/or camera instructions 1270 to facilitate camera-related processes and functions.

Memory 1250 can store application (or "app") instructions and data 1272, such as instructions for the apps described above in the context of FIGS. 2-10 and for modules 124-132 and 138. Memory 1250 can also store other software instructions 1274 for various other software applications in place on device 1200.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A federated learning system for model development comprising:
 a server accessible by each of a first and second client agent, the server comprising instructions which, when executed by one or more processors, cause the server to perform a process operable to:
  create a project based on an indication received from a first user device;
  receive collaborator information from the first user device, the collaborator information identifying one or more collaborators at a second site;
  receive a model configuration from the first user device;
  receive a request to import a first cohort from the first client agent residing on a first network associated with the first site, wherein the first cohort was generated by the first client agent accessing a first dataset, pseudonymizing or deidentifying it if it contains protected health information (PHI) or personal identifiable information (PII);

receive a request to import a second cohort from the second client agent residing on a second network associated with the second site, wherein the second cohort was generated by the second client agent accessing a second dataset, pseudonymizing or deidentifying it if it contains PHI or PII; and initiate, via one or more containers, a federated learning process based on the model configuration using the first and second cohorts as training data, the server operating as a federated server and the first and second client agents operating as federated learning clients.

2. The federated learning system of claim 1, wherein the process is further operable to:

generate a link to a communication platform for the project.

3. The federated learning system of claim 1, wherein the process is further operable to provide summary information for the first and second cohorts for display on a user interface of the first user device or through an application programming interface (API) used by the first user on the first user device.

4. The federated learning system of claim 3, wherein the summary information comprises at least one of statistics about the cohort or statistics about different fields within the cohort.

5. The federated learning system of claim 1, wherein initiating the federated learning process comprises:

exporting the first and second cohorts to one or more local directories or configuring the first and second cohorts to be accessible via an adapter; and accessing the first and second cohorts by the one or more containers via the one or more local directories or the adapter.

6. The federated learning system of claim 1, wherein receiving the model configuration comprises receiving a machine learning model packaged as a container, as code to be run directly, or into a container by the federated learning system.

7. The federated learning system of claim 1, wherein the process is further operable to provide training performance data from the federated learning process for display on a user interface of the first user device or accessible through an API used by the first user on the first user device, the training performance data comprising at least one of one or more model performance metrics or one or more loss-cases.

8. The federated learning system of claim 1, wherein the process is further operable to:

receive an updated first cohort from the first client agent;
receive an updated second cohort from the second client agent; and
initiate, via one or more containers, an updated federated learning process based on the model configuration using the first and second cohorts, the server operating as the federated server and the first and second client agents operating as the federated learning clients.

9. The federated learning system of claim 1, wherein the process is further operable to:

receive an updated model configuration from the first user device; and
initiate, via one or more containers, an updated federated learning process based on the updated model configuration using the first and second cohorts, the server operating as the federated server and the first and second client agents operating as the federated learning clients.

10. The federated learning system of claim 1, wherein the process is further operable to:

receive a schema definition from the first user device; and
provide the schema definition to at least one of the first client agent to validate the first dataset or the second client agent to validate the second dataset.

11. The federated learning system of claim 1, wherein the process is further operable to:

receive a project permission configuration from the first user device, the configuration comprising one or more data permissions for the one or more collaborators; and
enforce the permission configuration.

12. The federated learning system of claim 10, wherein the process is further operable to:

receive an updated schema definition from the first user device;
receive an updated first cohort from the first client agent;
transmit an indication to the one or more collaborators that the updated schema definition has been received;
receive an updated second cohort from the second client agent; and
initiate, via one or more containers, an updated federated learning process based on the model configuration using the first and second cohorts, the server operating as the federated server and the first and second client agents operating as the federated learning clients.

13. The federated learning system of claim 1, wherein the server is further operable to cause model results to be displayed on the first user device, wherein the displayed model results comprise at least one of a pre-configured set or a user-defined set of results.

14. The federated learning system of claim 1, wherein the server is further operable to:

receive a plurality of training experiments from the first user device, each training experiment comprising at least one of a distinct cohort, a distinct model hyperparameter, or a distinct model architecture; and
receive an indication for each training experiment from the first user device, each indication triggering a training of the model configuration with the respective training experiment.

15. The federated learning system of claim 14, wherein the process is further operable to at least one of:

compare performances of the plurality of training experiments;
track versions of a schema definition, the model configuration, and the first and second cohorts; or
perform one or more additional model runs for each version of a cohort.

\* \* \* \* \*